United States Patent
Beidaghi et al.

(10) Patent No.: US 9,892,869 B2
(45) Date of Patent: Feb. 13, 2018

(54) ELECTROCHEMICALLY ACTIVATED C-MEMS ELECTRODES FOR ON-CHIP MICRO-SUPERCAPACITORS

(75) Inventors: Majid Beidaghi, Miami, FL (US); Chunlei Wang, Miami, FL (US); Wei Chen, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 839 days.

(21) Appl. No.: 13/441,268

(22) Filed: Apr. 6, 2012

(65) Prior Publication Data

US 2014/0029161 A1    Jan. 30, 2014

Related U.S. Application Data

(60) Provisional application No. 61/472,591, filed on Apr. 6, 2011.

(51) Int. Cl.
*H01G 11/24* (2013.01)
*H01G 11/04* (2013.01)
*H01G 11/64* (2013.01)

(52) U.S. Cl.
CPC .............. *H01G 11/24* (2013.01); *H01G 11/04* (2013.01); *H01G 11/64* (2013.01); *Y02E 60/13* (2013.01)

(58) Field of Classification Search
CPC ........ C25D 11/02; H01G 11/04; H01G 11/24; H01G 11/64; Y02E 30/13
USPC .......................................... 205/57, 687, 688
See application file for complete search history.

(56) References Cited

U.S. PATENT DOCUMENTS

2006/0068107 A1*  3/2006  Madou et al. ............. 427/249.1

OTHER PUBLICATIONS

Sullivan et al., "Thick active layers of electrochemically modified glassy carbon, Electrochemical impedance studies articles", J. Electrochem. Soc., 147(1):308-17 (2000).*

Sullivan et al., "Electrochemically modified glassy carbon for capacitor electrodes characterization of thick anodic layers by cyclic voltammetry, differential electrochemical mass spectrometry, spectroscopic ellipsometry, x-ray photoelectron spectroscopy, FTIR and AFM" J. E ectrochem. Soc., 147(7):2636-43 (2000).*

R. Martinez-Duarte, G. Turon Teixidor, P.P. Mukherjee, Q. Kang,and M.J. Madou, "Chapter 5: Perspectives of Micro and Nanofabrication of Carbon for Electrochemical and Microfluidic Applications," in Microfluidics and Microfabrication, 2010, pp. 181-263.*

Electroanalytical Performance of Carbon Films with Near-Atomic Flatness Srikanth Ranganathan and and Richard L. McCreery* Analytical Chemistry 2001 73 (5), 893-900 DOI: 10.1021/ac0007534.*

Aleksandar Dekanski, Jasna Stevanović, Rade Stevanović, Branislav Ž Nikolić, Vladislava M Jovanović, Glassy carbon electrodes: I. Characterization and electrochemical activation, Carbon, vol. 39, Issue 8, Jul. 2001, pp. 1195-1205, ISSN 0008-6223, http://dx.doi.org/10.1016/S0008-6223(00)00228-1.*

(Continued)

*Primary Examiner* — Louis J Rufo
(74) *Attorney, Agent, or Firm* — Marshall, Gerstein & Borun LLP

(57) ABSTRACT

Disclosed herein are methods of manufacturing micro-super capacitors from C-MEMS structures.

13 Claims, 21 Drawing Sheets

(56) References Cited

OTHER PUBLICATIONS

Genis Turon Teixidor*, Rabih B. Zaouk, Benjamin Y. Park, Marc J. Madou, "Fabrication and characterization of three-dimensional carbon electrodes for lithium-ion batteries" Journal of Power Sources 183 (2008) 730-740.*
Albano et al., A fully integrated microbattery for an implantable microelectromechanical system, J. Power Sources, 185(2):1524-32 (2008).
Beidaghi et al., Electrochemically activated carbon micro-electrode arrays for electrochemical micro-capacitors, J. Power Sources, 196(4):2403-9 (2011).
Beidaghi et al., Micro-supercapacitors based on three dimensional interdigital polypyrrole/C-MEMS electrodes, Electrochim. Acta, 56(25):9508-14 (2011).
Braun et al., Exponential growth of electrochemical double layer capacitance in glassy carbon during thermal oxidation, Carbon, 41:759-65 (2003).
Braun et al., Small-angle neutron scattering and cyclic voltammetry study on electrochemically oxidized and reduced pyrolytic carbon, Electrochim. Acta, 49(7):1105-12 (2004).
Cheng et al., Graphene and carbon nanotube composite electrodes for supercapacitors with ultra-high energy density, Phys. Chem. Chem. Phys., 13:17615-24 (2011).
Chmiola et al., Monolithic carbide-derived carbon films for micro-supercapacitors, Science, 328(5977):480-3 (2010).
Compton et al., Chemically active reduced graphene oxide with tunable C/O ratios, ACS Nano, 5(6):4380-91 (2011).
Conway et al., Double-layer and pseudocapacitance types of electrochemical capacitors and their applications to the development of hybrid devices, J. Solid State Electrochem., 7(9):637-44 (2003).
Conway, Electrochemical Supercapacitors: Scientific Fundamentals and Technological Applications, New York: Kluwer (1999).
Cook-Chennault et al., Powering MEMS portable devices-a review of non-regenerative and regenerative power supply systems with special emphasis on piezoelectric energy harvesting systems, Smart Mater. Struct., 17:043001 (2008).
Dekanski et al., Glassy carbon electrodes: I. Characterization and electrochemical activation, Carbon, 39:1195-205 (2001).
Fan et al., Deoxygenation of exfoliated graphite oxide under alkaline conditions: a green route to graphene preparation, Adv. Mater., 20(23):4490-3 (2008).
Frackowiak, Carbon materials for supercapacitor application, Phys. Chem. Chem. Phys., 9:1774-85 (2007).
Gao et al., Direct laser writing of micro-supercapacitors on hydrated graphite oxide films, Nat. Nanotechnol., 6(8):496-500 (2011).
Gao et al., New insights into the structure and reduction of graphite oxide, Nat. Chem., 1(5):403-8 (2009).
Gogotsi et al., Materials science, True performance metrics in electrochemical energy storage, Science, 334(6058):917-8 (2011).
Heon et al., Continuous carbide-derived carbon films with high volumetric capacitance, Energy Environ. Sci., 4:135-8 (2011).
Huang et al., Photocatalytically reduced graphite oxide electrode for electrochemical capacitors, J. Phys. Chem. C, 115(42):20689-95 (2011).
In et al., Origami fabrication of nanostructured, three-dimensional devices: electrochemical capacitors with carbon electrodes, Appl. Phys. Lett., 88(8):083104 (2006).
Kaempgen et al., Printable thin film supercapacitors using single-walled carbon nanotubes, Nano Lett., 9(5):1872-6 (2009).
Kierzek et al., Electrochemical capacitors based on highly porous carbons prepared by KOH activation, Electrochim. Acta, 49(4):515-23 (2004).
Li et al., Theoretical and experimental specific capacitance of polyaniline in sulfuric acid, J. Power Sources, 190(2):578-86 (2009).
Lim et al., Thin film supercapacitors using a sputtered RuO2 electrodeJ. Electrochem. Soc., 148:A275-8 (2001).
Long et al., Three-dimensional battery architectures, Chem. Rev., 104(10):4463-92 (2004).
Miller et al., Graphene double-layer capacitor with ac line-filtering performance, Science, 329(5999):1637-9 (2010).
Morse, Micro-fuel cell power sources, Int. J. Energy Res., 31(7-7):576-602 (2007).
Nagaoka et al., Surface properties of electrochemically pretreated glassy carbon, Anal. Chem., 58(6):1037-42 (1986).
Niu et al., Requirements for performance characterization of C double-layer supercapacitors: Applications to a high specific-area C-cloth material, 156(2):725-40 (2006).
Paradiso et al., Energy scavenging for mobile and wireless electronics, IEEE Pervasive Computing, 4(1): 18-27 (2005).
Pech et al., Elaboration of a microstructured inkjet-printed carbon electrochemical capacitor, J. Power Sources, 195(4):1266-9 (2010).
Pech et al., Ultrahigh-power micrometre-sized supercapacitors based on onion-like carbon, Nat. Nanotechnol., 5(9):651-4 (2010).
Presser et al., Flexible nano-felts of carbide-derived carbon with ultra-high power handling capability, Adv. Energy Mater., 1:423-30 (2011).
Ruch et al., A dilatometric and small-angle X-ray scattering study of the electrochemical activation of mesophase pitch-derived carbon in non-aqueous electrolyte solution, Carbon, 48(7):1880-86 (2010).
Simon et al., Materials for electrochemical capacitors, Nat. Mater., 7(11):845-54 (2008).
Singh et al., Pyrolysis of Negative Photoresists to Fabricate Carbon Structures for Microelectromechanical Systems and Electrochemical Applications, J. Electrochem. Soc., 149(3):E78-83 (2002).
Stoller et al., Graphene-based ultracapacitors, Nano Lett., 8(10):3498-502 (2008).
Sullivan et al., Electrochemically modified glassy carbon for capacitor electrodes characterization of thick anodic layers by cyclic voltammetry, differential electrochemical mass spectrometry, spectroscopic ellipsometry, x-ray photoelectron spectroscopy, FTIR and AFM, J. Electrochem. Soc., 147(7):2636-43 (2000).
Sullivan et al., Thick active layers of electrochemically modified glassy carbon. Electrochemical impedance studies articles, J. Electrochem. Soc., 147(1):308-17 (2000).
Sun et al., Preparation and characterization of polypyrrole films for three-dimensional micro supercapacitor, J. Power Sources, 193:924-9 (2009).
Sung et al., Fabrication of all-solid-state electrochemical microcapacitors, J. Power Sources, 133:312-9 (2004).
Taberna et al., Electrochemical characteristics and impedance spectroscopy studies of carbon-carbon supercapacitors, J. Electrochem. Soc., 150(3):A292-300 (2003).
Wang et al., A novel method for the fabrication of high-aspect ratio C-MEMS structures, J. Microelectromechanical Systems, 14(2):348-58 (2005).
Wang et al., A review of electrode materials for electrochemical supercapacitors, Chem. Soc. Rev., 41:797-828 (2012).
Wang et al., An all-solid-state flexible micro-supercapacitor on a chip, Adv. Energy Mater., 1(6):1068-72 (2011).
Wang et al., C-MEMS for the manufacture of 3D microbatteries, Electrochem. Solid-State Lett, 7:A435-8 (2004).
Wang et al., Carbon as a MEMS material: micro and nanofabrication of pyrolysed photoresist carbon, Int. J. of Manufacturing Technol. and Management, 13(2/3/4):360-75 (2008).
Wang et al., Electrochemical supercapacitor electrode material based on poly(3,4-ethylenedioxythiophene)/polypyrrole composite, J. Power Sources, 163(2):1120-5 (2007).
Wang et al., Preventing graphene sheets from restacking for high-capacitance performance, J. Phys. Chem. C, 115(46):23192-7 (2011).
Wang et al., Supercapacitor devices based on graphene materials, J. Phys. Chem. C, 113(30):13103-7 (2009).
Weng et al., Graphene-cellulose paper flexible supercapacitors, Adv. Energy Mater., 1(5):917-22 (2011).
Xu et al., Carbon post-microarrays for glucose sensors, Biosensors and Bioelectronics, 23(11):1637-44 (2008).
Xu et al., Polymer photovoltaic devices with transparent graphene electrodes produced by spin-casting, Carbon, 48(11):3308-11 (2010).

(56) References Cited

OTHER PUBLICATIONS

Xu et al., What is the choice for supercapacitors: graphene or graphene oxide?, Energy Environ. Sci., 4:2826-30 (2011).
Xue et al., Microfluidic etching for fabrication of flexible and all-solid-state micro supercapacitor based on $MnO_2$ nanoparticles, Nanoscale, 3(7):2703-8 (2011).
Yang et al., Design and tailoring of a hierarchical graphene-carbon nanotube architecture for supercapacitors, J. Mater. Chem., 21:2374-80 (2011).
Yoo et al., Ultrathin planar graphene supercapacitors, Nano Lett., 11(4):1423-7 (2011).
Zangmeister, Preparation and evaluation of graphite oxide reduced at 220° C, Chem. Mater., 22(19):5625-9 (2010).
Zhu et al., Carbon-based supercapacitors produced by activation of graphene, Science, 24:1537-41 (2011).
Zuo et al., Effects of the heating history of impregnated lignocellulosic material on pore development during phosphoric acid activation, Carbon, 48(11):3293-5 (2010).

* cited by examiner

ELECTROCHEMICALLY ACTIVATED C-MEMS ELECTRODES FOR ON-CHIP MICRO-SUPERCAPACITORS

CROSS REFERENCE TO RELATED APPLICATIONS

The benefit is claimed of U.S. Provisional Patent Application No. 61/472,591, filed Apr. 6, 2011, the disclosure of which is incorporated by reference in its entirety.

STATEMENT OF GOVERNMENTAL INTEREST

This invention was made with government support under Grant No. HR0011-08-1-0036 awarded by the Defense Advanced Research Projects Agency (DARPA). The government has certain rights in the invention.

BACKGROUND

Development of miniaturized electronic systems has driven the demand for miniaturized power sources that can be integrated into such systems. Several kinds of micron-sized power sources such as micro-batteries, micro-fuel cells, and energy harvesters have been developed in recent years. However, for the applications that require high power, there is a need for miniaturized electrochemical capacitors (micro-capacitors). Electrochemical micro-capacitors with high power density can be coupled with energy harvesting devices to store the generated energy. Moreover, they can also be paired with micro-batteries to provide the peak power and improve the cycle lifetime. Based on the charge storage mechanism, electrochemical capacitors (ECs) can be divided into electric double layer capacitors (EDLCs) and pseudo-capacitors. The former utilizes interfacial double layer capacitance of various types of carbon materials to store electric charge. The latter, the pseudo-capacitor or redox capacitor, uses fast and reversible surface or near-surface redox reactions for charge storage. The active materials of pseudo-capacitors include transition metal oxides and conductive polymers. Micro-capacitors of both types have been reported in the literature. For example, Lim et al., 148 J. Electrochem. Soc. A275-278 (2001) reported that a thin film EC based on pseudo-capacitive ruthenium oxide ($RuO_2$) and Lipon solid electrolyte delivered a volumetric capacitance of about 38 $mFcm^{-2}$ $\mu m^{-1}$, however its capacitance dropped by 53% after 500 cycles.

Electrochemical micro-capacitor based on conductive polymer was first reported by Sung et al., 133 J. Power Sources 312-19 (2004) who fabricated Polypyrrole (Ppy) micro-electrodes by electrochemical deposition on interdigitated gold electrodes. More recently, Sun et al., 193 J. Power Sources 924-29 (2009) reported the fabrication of three dimensional (3D) Ppy electrode architectures for micro-capacitors with geometric capacitance of the 27 $mFcm^{-2}$ (normalized by the footprint area) at 1 $mAcm^{-2}$ current density. On the other hand, EDLCs usually have higher rate capability, higher power density, and an extended cyclic life compared to pseudo-capacitors. In recent years, there have been some efforts to fabricate micro-scale EDLCs. For example, fabrication of printable thin film ECs with single-walled carbon nanotubes as electroactive materials has been reported by Kaempgen et al., where the estimated capacitance of the fabricated cell was 1.1 $mFcm^{-2}$, in a potential window of 0 to 1.0 V. In addition, ECs from inkjet printing of activated carbon powders on interdigitated gold current collectors reached the maximum cell capacitance of 2.1 $mFcm^{-2}$ at a low scan rate of 1 $mVs^{-1}$.

SUMMARY

Disclosed herein are methods of modifying C-MEMS structures to provide materials that can act as micro-super capacitors. In some cases, the C-MEMS structures are modified by electrochemically modifying their surface to increase their surface area, e.g., by greater than 100 times, by greater than 500 times, or by greater than 1000 times the starting C-MEMS' surface area. In various cases, the C-MEMS structures are modified by depositing graphene oxide on at least a portion of the surface. In various cases, the C-MEMS structures are modified by depositing a conducting polymer on the surface, for example polypyrole or polyaniline. Other non-limiting examples of conducting polymers contemplated include polyacetylene (PAC), polyphenylene vinylene (PPV), polythiophene (PT), polyphenylene sulfide (PPS), poly(3,4-ethylenedioxythiophene) (PEDOT), polypyrole (PPY), polyaniline (PANI), and combinations thereof.

Regardless of the modification, the resulting structure is suitable as a micro-super capacitor. The super capacitors can be prepared on-chip with other electronic components, such as batteries, micro fuel cells, or other energy devices that provide peak power. IN accordance with at least some contemplated methods, the methods for creating these micro-super capacitors may employ some methodology that is similar to that used to provide other electronic components. Consequently, one possible advantage of the disclosed methods is that the super capacitors can be prepared using a single manufacturing process to provide an electrical device, e.g., on the same chip. These micro-supercapatitors (alternatively referred to throughout this disclosure as micro-capactiors and supercapatitors) can be components in devices further comprising, e.g., battery, fuel cell, and/or biosensor. Such devices can be used as, or in, miniature portable electronic devices, cardiac pacemakers, hearing aids, smart cards, personal gas monitors, embedded monitors, remote sensors, or the like. The disclosed C-MEMS micro-supercapacitors may prove suitable for use in still other devices.

The disclosed C-MEMS micro-supercapacitors, whether electrochemically activated or having a conducing polymer or graphene oxide deposition on its surface, can have a volumetric capacitance of at least 30 $mFcm^{-2}$, and can have a capacitance of about 30 to about 165 $mFcm^{-2}$, at least 45, at least 50, at least 60, at least 70, at least 80, at least 90, at least 100, at least 110, at least 120, at least 130, at least 140, or at least 150 $mFcm^{-2}$.

DETAILED DESCRIPTION

Figure 1:
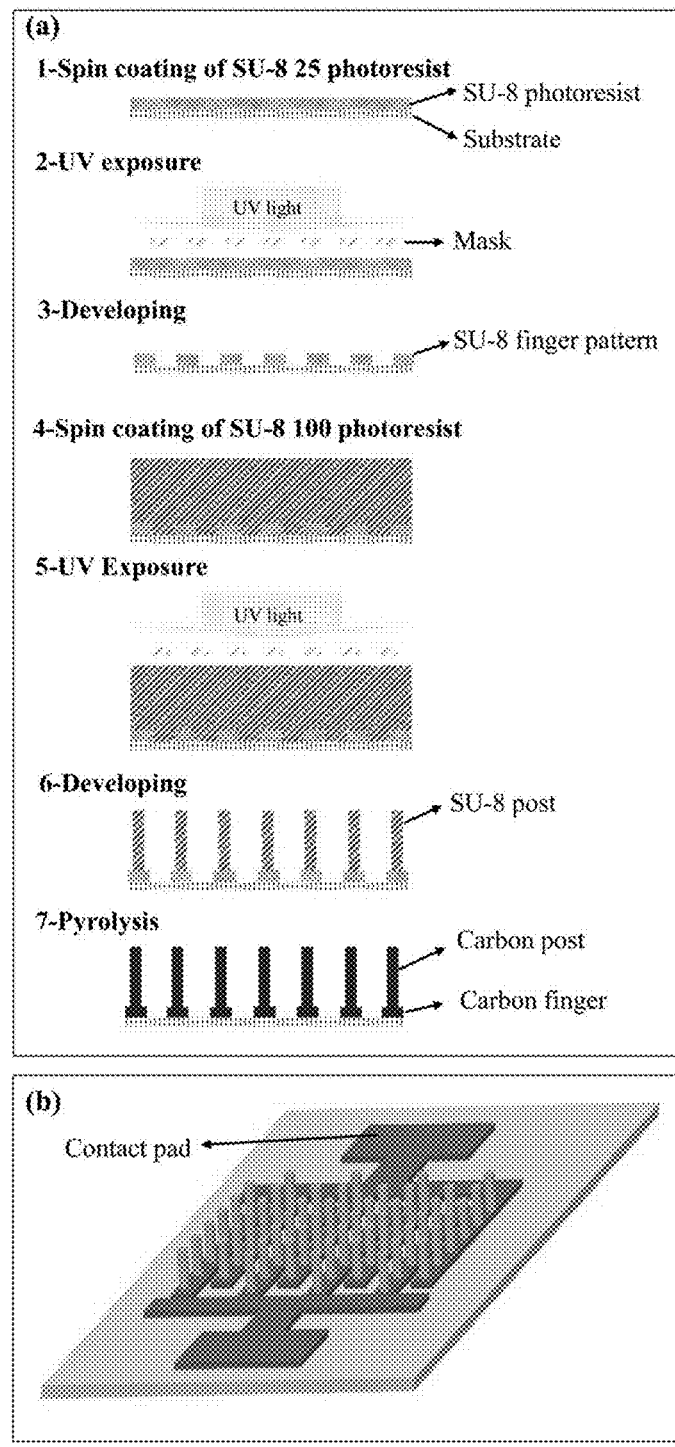
FIG. 1(a) is a schematic illustration of a typical process flow for fabricating C-MEMS electrodes.
FIG. 1(b) is a schematic 3D view of a sample after carbonization.

Micro-electrodes for electrochemical capacitors can be fabricated using the carbon electrochemical systems (C-MEMS) technique. An activation method can be employed to improve electrochemical properties of C-MEMS electrodes. Advantageously, the activated C-MEMS electrodes can exhibit higher specific capacitance as compared to non-activated C-MEMS electrodes. Micro-electrodes in accordance with embodiments of the disclosure have application in the field of micro-power sources. The high specific capacitance and relatively high power that can be achieved by embodiments of the micro-electrodes of the disclosure can increase the use of micro-supercapacitors as micro-power sources.

The C-MEMS technique is a simple and reproducible process for fabricating various glassy carbon structures with micro patterns, in which patterned photoresist is pyrolyzed and converted into carbon under high temperatures in an inert atmosphere. The advantages of using C-MEMS to fabricate micro-capacitor electrodes are that this technique is compatible with other MEMS processes and allows the possibility to fabricate 3D glassy carbon micro-scaled architectures. This technique has been used before by Wang et al. to fabricate carbon electrodes for micro-batteries. See C. Wang, L. Taherabadi, G. Jia, M. Madou, Y. Yeh, B. Dunn, Electrochem. SolidState Lett. 7 (2004) A435-A438 and J. W. Long, B. Dunn, D. R. Rolison, H. S. White, Chem. Rev. 104 (2004) 4463-4492, the disclosures of which are incorporated herein by reference. Typical glassy carbon consists of embedded closed pores, which can be opened by an appropriate activation process, such as thermal activation and electrochemical activation. See A. Braun, M. Bartsch, 0. Merlo, B. Schnyder, B. Schaffner, R. Kötz, O. Haas•A.

Wokaun, Carbon 41 (2003) 759-765, M. G. Sullivan, B. Schnyder, M. Bartsch, D. Alliata, C. Barbero, R. Imhof, R. Kötz, J. Electrochem. Soc. 147 (2000) 2636-2643, and A. Dekanski, J. Stevanovic, R. Stevanocic, B. Z. Nikolic, V. M. Jovanovic, Carbon 39 (2001) 1195-1205.

Electrochemical activation can be employed to improve the performance of the C-MEMS structures. Cyclic voltammetry (CV) and galvanostatic charge-discharge experiments were conducted to evaluate electrochemical performance of the activated micro-electrodes. The capacitive performances of activated and non-activated micro-electrode arrays were compared.

Preparation of C-MEMS Electrodes

The C-MEMS electrodes can be prepared by a two-step photolithography process followed by a pyrolysis step. In one embodiment, the substrate was SiO2 (2000 A)ISi. Negative tone photo resists can be used for the lithography process. In one embodiment, two kinds of negative tone photoresists, NANO™ SU-8 25 and SU-8 100 (MicroChem. Corp.), were used for the lithography process. In each step, development was carried out using a NANO™ SU-8 developer (MicroChem. Corp.). All other chemicals were purchased from Sigma-Aldrich. UV lithography was performed using an OAI 800 mask aligner. Detailed fabrication steps of C-MEMS structures are schematically presented in FIG. 1(a). In the embodiment shown, a two dimensional interdigitated finger pattern was firstly created using the photolithography of SU-8 25 photoresist. SU-8 25 was spin coated on the substrate with initial speed of 500 rpm and then accelerated to 3000 rpm and stayed for 30 s. Then, the spin coated photoresist was baked for 3 min at 65° C. and 7 min at 95° C. on a leveled hotplate. The backed photoresist was patterned with a UV exposure dose of 300 mJcm$^{-2}$. Post-exposure bake was done for 1 min at 65° C. and 5 min at 95° C. on a leveled hotplate.

Next, another photolithography process was employed using the SU-8 100 photoresist to create cylindrical posts on patterned fingers. In this step of the process, SU-8 100 was first spin coated on a finger patterned substrate, where a speed of 500 rpm was chosen to spread the photoresist, after which the speed was increased to 1500 rpm and kept at this speed for 30 s. Spin coated photoresist was then baked for 10 min at 65° C. and 45 min at 95° C. in an oven. The exposure was done using a UV exposure dose of 700 mJcm$^{-2}$. Post-exposure bake was performed for 3 min at 65° C. and 10 min at 95° C. in an oven. Then the sample was developed in the SU-8 developer. Finally, the resulting SU-8 structures were pyrolyzed at 1000° C. for 1 h in forming gas atmosphere (i.e., 95% nitrogen and 5% hydrogen). To remove the residual carbon between the fingers after pyrolysis, all samples were subjected to oxygen plasma treatment at 400 mTorr with a power of 150 W for 20 s prior to other experimental investigations. After plasma treatment electrical resistance between the interdigitated electrodes was measured and the resistance in the order of mega Ohms was confirmed. The total numbers of samples which are used for different characterization methods were 28 interdigitated C-MEMS micro-electrode arrays (Schematically shown in FIG. 1(b)).

Electrochemical Activation

To perform electrochemical activation on both electrodes of each C-MEMS micro capacitor, the two electrodes were connected together through the contact pads (schematically shown in FIG. 1(b)) with a piece of silver wire. Then the contact pads and the silver wire were fully covered by epoxy resin to prevent their exposure to the electrolyte. Subsequently, the sample was composed into a three-electrode system as the working electrode. The reference and counter electrodes were Ag/AgCl and a Pt wire, respectively. It will be appreciated that other three-electrode systems can be used. Electrochemical activation was performed in 0.5 M H$_2$SO$_4$ solution deaerated by nitrogen bubbling. Other acids contemplated include nitric acid, phosphoric acid, hydrochloric acid, or mixtures thereof. The concentration of the acid can be 0.1 M to 2 M. A voltage can be applied to the three electrode system (e.g., a Ag/AgCl and Pt wire). The voltage can be about 1.5 to about 4 V, with respect to a Ag/AgCl reference electrode. In some cases, the voltage is about 1.9V. The duration of the application of the voltage can be at least 10 min, or for about 10 to about 30 minutes, or for about 15 to about 45 minutes. In a specific case, a voltage of 1.9 V can be applied to the electrodes for the durations of either 10 min or 30 min using a multichannel potentiostat/galvanostat (VMP3, Princeton Applied Research). The electrodes can then be negatively polarized at −0.3 V for 10 min. After electrochemical pretreatment, the electrodes can be washed, e.g., with DI water.

Characterization

The microstructure of electrodes was investigated by a JOEL 6335 field-emission scanning electron microscope (FE-SEM). Electrochemical performance tests were performed in two-electrode electrochemical cells, where one of the interdigitated electrodes acted as the working electrode and the other as the counter electrode. The electrolyte was deaerated 0.5 M H$_2$SO$_4$ aqueous solution. CVs were recorded at different scan rates ranging from 5 to 200 mV s$^{-1}$. Galvanostatic charge/discharge experiments were performed under various current densities in the voltage range between 0 and 1 V. All the electrochemical tests were carried out in room temperature.

For each sample, geometric surface area and volume were measured using SEM and optical microscope images. The density of the photoresist-derived carbon was measured by calculating the weight of 5 carbon films with known thickness and geometric area. The average density was 1.52 g cm$^{-3}$. The weight of each electrode was estimated by multiplying geometric volume into the average density of photoresist derived carbon.

The surface area of the C-MEMS structure after exposure to the electrochemical cell was increased, compared to prior to exposure. The surface area increased at least 100 times, at least 200 times, at least 300 times, at least 400 times, at least 500 times, at least 600 times, at least 700 times, at least 800 times, at least 900 times, at least 1000 times, compared to the surface area of the initial surface area of the C-MEMS structure.

To confirm the accuracy of measured weights by this method, weights of 5 electrodes were measured by subtracting the measured weight before and after the removal of the electrodes from the substrate. The measured weights by the two methods were in good agreement and the average deviation in calculated weights was about 5%.

For each electrodes, specific gravimetric capacitance, specific geometric capacitance, and specific volumetric capacitance is the capacitance of the electrode normalized by its mass, geometric surface area, and volume, respectively.

Structural Characterization

Figure 2:
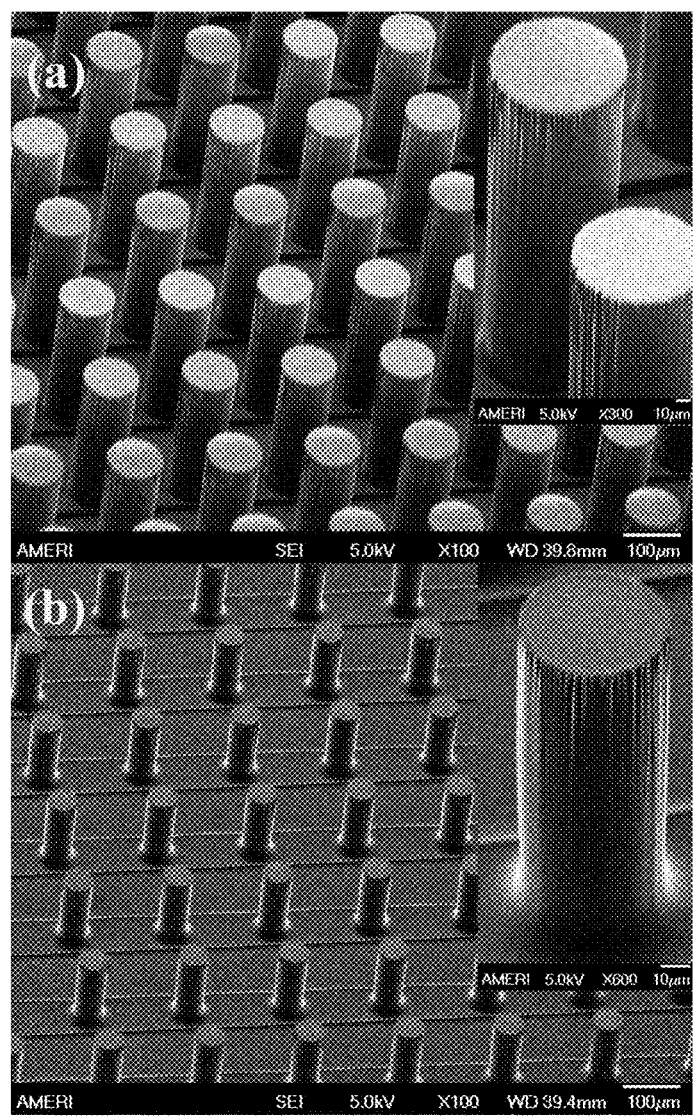
FIG. 2 is SEM images of C-MEMS electrodes. (a) SU-8 structure (b) carbonized structure. The insets show higher magnification images.

FIG. 2 shows typical SEM micrographs of C-MEMS electrodes. Carbon posts are perfectly aligned on carbon fingers and the device has two interdigitated 3D electrodes. The total footprint area of a typical sample is 9 mm×9 mm with a total of 50 interdigitated fingers (25 fingers for each electrode) and the finger widths were about 100 microns.

After carbonization, the measured post diameters of samples ranged from about 53 to 68 microns. The heights of carbon posts of different samples varied from about 115 to 140 microns with an average of about 130 microns. The origin of variation of post height and diameter for different samples is attributed to the difference in wafer chip size and small variations of the amount of photoresist used for spin coating during fabrication of each sample. It is believed that the dimensions of carbon post for different samples can be effectively controlled by optimizing experimental parameters during the fabricating process. Due to the good adhesion of SU-8 25 to the substrate, the shrinkage of fingers during carbonization is less than the posts. On the other hand, the adhesion of SU-8 fingers and posts are also very good. Therefore, the shrinkage of structure in contact regions of fingers and posts are controlled by shrinkage of fingers. As a results, the posts have shrunk less near the base of the structures than at the midsection.

Electrochemical Tests—Non-Activated Samples

Figure 3:
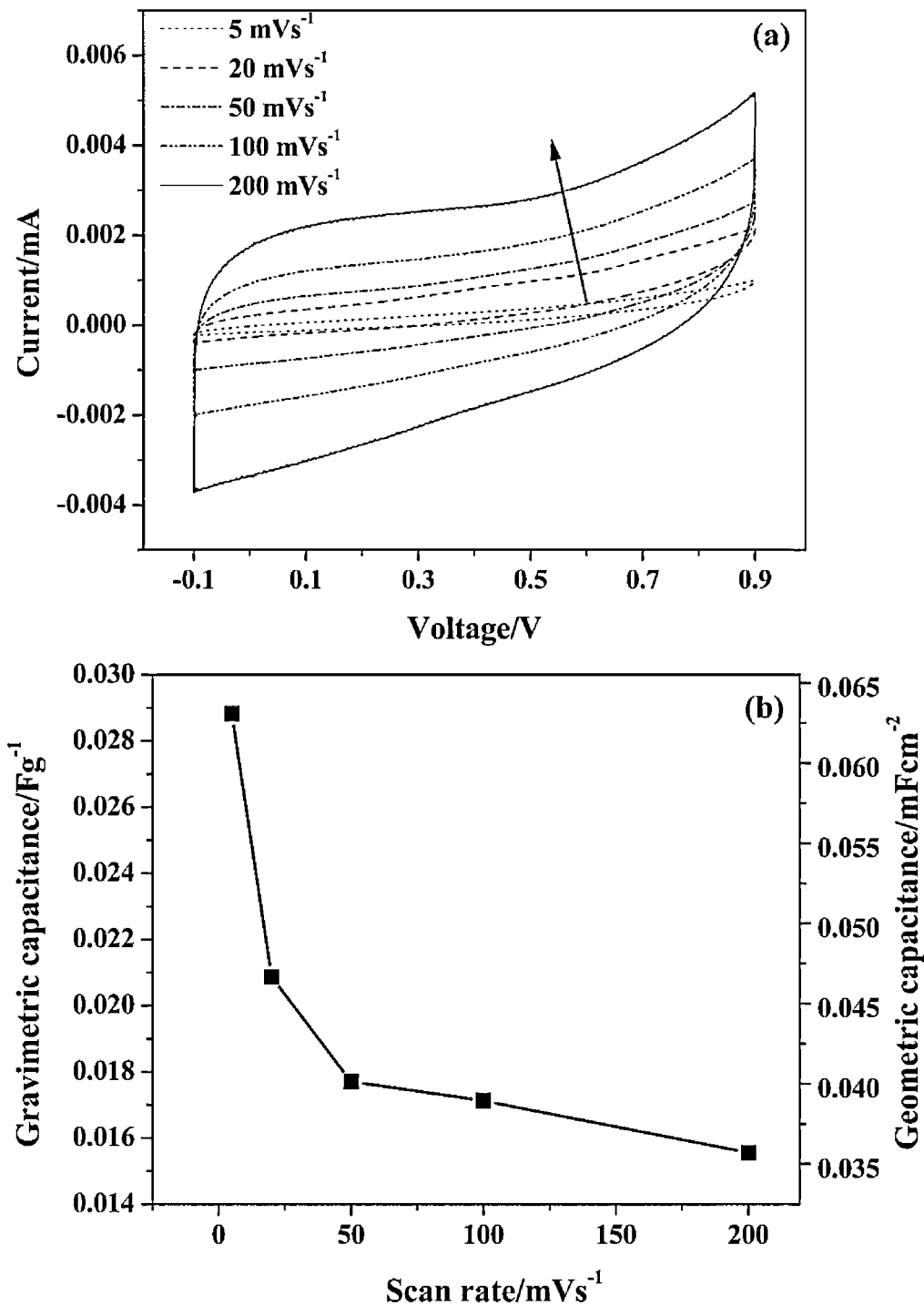
FIG. 3(a) is graph of CVs of a non-activated sample (the arrow shows the direction of increasing scan rate)
FIG. 3(b) is graph of the specific gravimetric and geometric capacitance of a non-activated sample at various scan rates.

CV was used to determine electrochemical properties of non-activated samples. FIG. 3(a) shows the CV curves of a non-activated sample at various scan rates. The CV curves show a near rectangular shape at all scan rates. The average current is low, ranging from 3.48 to 2.84 µA, and increases by increasing the scan rate. The capacitance of the two electrode cells can be calculated according to the Equation 1:

$$C = \frac{\int I(V)dV}{2s\Delta V} \quad \text{Equation 1}$$

Where $\int I(V)dV$ is the total voltammetric charge obtained by the integration of positive and negative sweep in cyclic voltammograms, s is the scan rate and $\Delta V$ is the width of the potential window. The capacitance calculated from Equation 1 is the total capacitance of the cell, which is the sum of the two equivalent single electrode capacitors in the series. To calculate the specific gravimetric and geometric capacitance of each electrode, equations 2 and 3 can be used, respectively:

$$C_m = \frac{2C}{m} \quad \text{Equation 2}$$

$$C_A = \frac{2C}{A} \quad \text{Equation 3}$$

Where $C_m$ is the specific gravimetric capacitance, C is the total capacitance of the cell, m is the mass, $C_A$ is the specific geometric capacitance and A is the total geometric surface area of a single electrode. The two electrodes of the device have identical design specifications and have been fabricated simultaneously during the fabrication process. Moreover, the electrodes were activated at the same time in one electrochemical cell. Therefore, for calculating the capacitance, we have assumed that the two electrodes of the device have identical capacitance value.

FIG. 3(b) shows the specific gravimetric and geometric capacitances of C-MEMS electrodes measured at different scan rates of 5, 20, 50, 100, and 200 mVs$^{-1}$. The specific capacitance decreases gradually by increasing the scan rate and the highest value of geometric capacitance of about 0.07 mFcm$^{-2}$ is found at the lowest scan rate of 5 mVs$^{-1}$. At this scan rate the specific gravimetric capacitance is calculated as about 0.03 F g$^{-1}$. Considering the relatively smooth and pore-free surface of the photoresist derived carbon structures, the low specific capacitance of as-pyrolyzed C-MEMS electrodes is reasonable. This implies the active surface of these electrodes is limited to their measurable geometric surface.

Electrochemical Tests—Electrochemically Activated Samples

Figure 4:
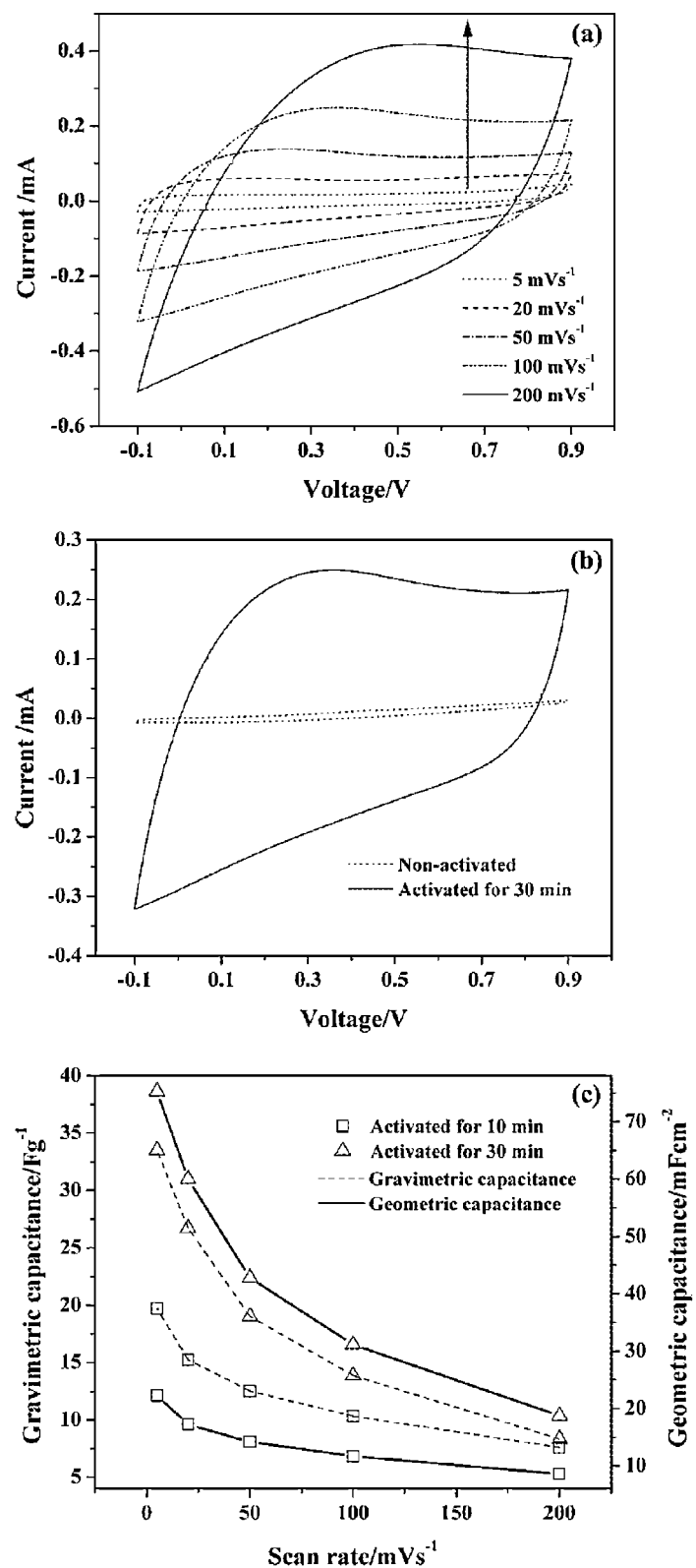
FIG. 4(a) is a graph of CVs of microelectrodes in two-electrode cells after activation for 30 min at different scan rates (the arrow shows the direction of increasing scan rate)
FIG. 4(b) is a graph of typical CVs of samples before and after activation for 30 minutes in 0.5 M $H_2SO_4$ aqueous electrolyte at 100 $mVs^{-1}$ scan rate.
FIG. 4(c) is a graph of the specific gravimetric and geometric capacitance of activated samples at various scan rates.

FIG. 4(a) presents the CV curves at different scan rates of a sample activated for 30 min. The curves at all scan rates show a near rectangular shape and a broad band was observed on top of these rectangular responses. It is known that the anodic oxidation of samples increases the amount of oxygen groups on the electrode surface. A broad peak at about 0.2V to about 0.4 V during anodic sweep can be attributed to the contribution of active oxygen surface groups generated by electrochemical treatment. CV studies of electrochemically activated glassy carbon by Nagaoka et al., 58 Anal. Chem. 1037-42 (1986) also show a similar broad peak on anodic curves. In addition, the shapes of anodic/cathodic sweeps are asymmetric, which is in accordance with the reports by Sullivan et al., 147 J. Electrochem. Soc. 2636-43 (2000), Sullivan et al., 147 J. Electrochem. Soc. 308-17 (2000), and Nagaoka et al., 58 Anal. Chem. 1037-42. Without intending to be bound by theory, it is believed that this is due to either slow electron transfer between surface redox active groups and the bulk glassy carbon, or charging effects resulting from small pores and microcracks.

In FIG. 4(b) CV curves of a non-activated and a sample activated for 30 min are compared at the same 100 mVs-1 scan rate. The area of the activated sample's CV curve is significantly larger than that of the non-activated sample, which implies the enhancement of the specific capacitance after activation. The gravimetric and geometric specific capacitance of samples activated for 30 min and 10 min were calculated from CV curves (shown in FIG. 4(c)). For all samples, the specific capacitance decreases with an increase in the scan rate. The specific gravimetric capacitance of the sample activated for 30 min (about 33 Fg$^{-1}$) was almost three orders of magnitude higher than the non-activated sample (about 0.03 Fg$^{-1}$). At a scan rate of 5 mVs$^{-1}$, the geometric capacitance for the non-activated and activated (30 min) samples was about 0.07 mFcm$^{-2}$ and about 75 mFcm$^{-2}$, respectively. The geometric capacitance of the sample activated for 10 min was about 22 mFcm$^{-2}$. At the same scan rate, the volumetric capacitance of samples activated for 10 min and 30 min was about 14 Fcm$^{-3}$ and about 48 Fcm$^{-3}$, respectively. The specific capacitances at different scan rates of the sample activated for 30 min are higher than that of samples activated for 10 min at corresponding scan rates.

Figure 5:
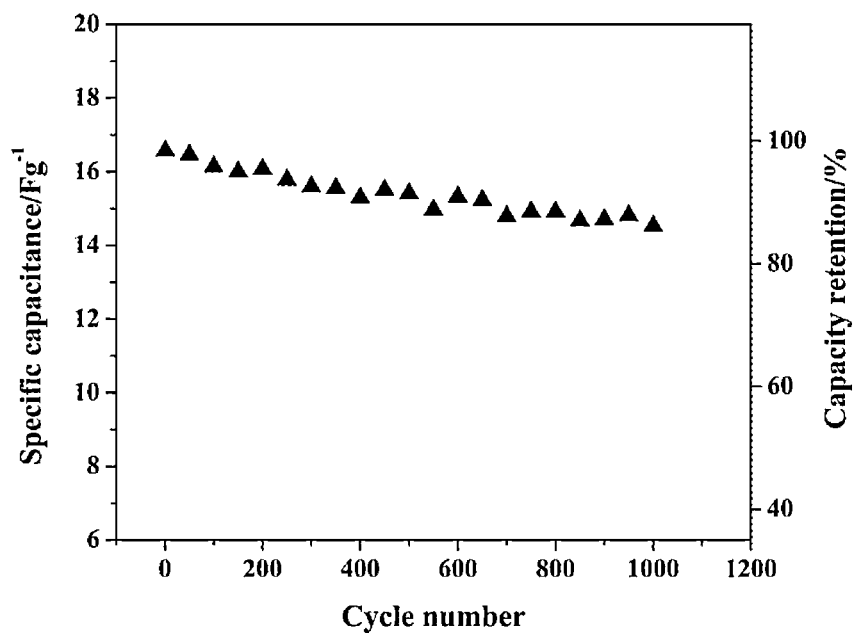
FIG. 5 is a graph of the cyclic performance and capacity retention for an activated sample.

The C-MEMS sample activated for 30 min was also examined by CV tests for 1000 cycles at the scan rate of 50 mVs$^{-1}$ in the two electrode system. The capacitance value is shown in FIG. 5. The specific capacitance of this sample at the first cycle was about 17 F g$^{-1}$. After 1000 cycles, the specific capacitance was 15 F g-$^1$ and there was only 12.3% fade of the initial capacitance. This indicates acceptable cyclability of activated micro-electrodes compared, for example, to electrochemical micro-capacitors reported by Lim et al., 148 J. Electrochem. Soc. A275-78 (2001) where 53% of the initial capacitance faded after 500 cycles.

Figure 6:
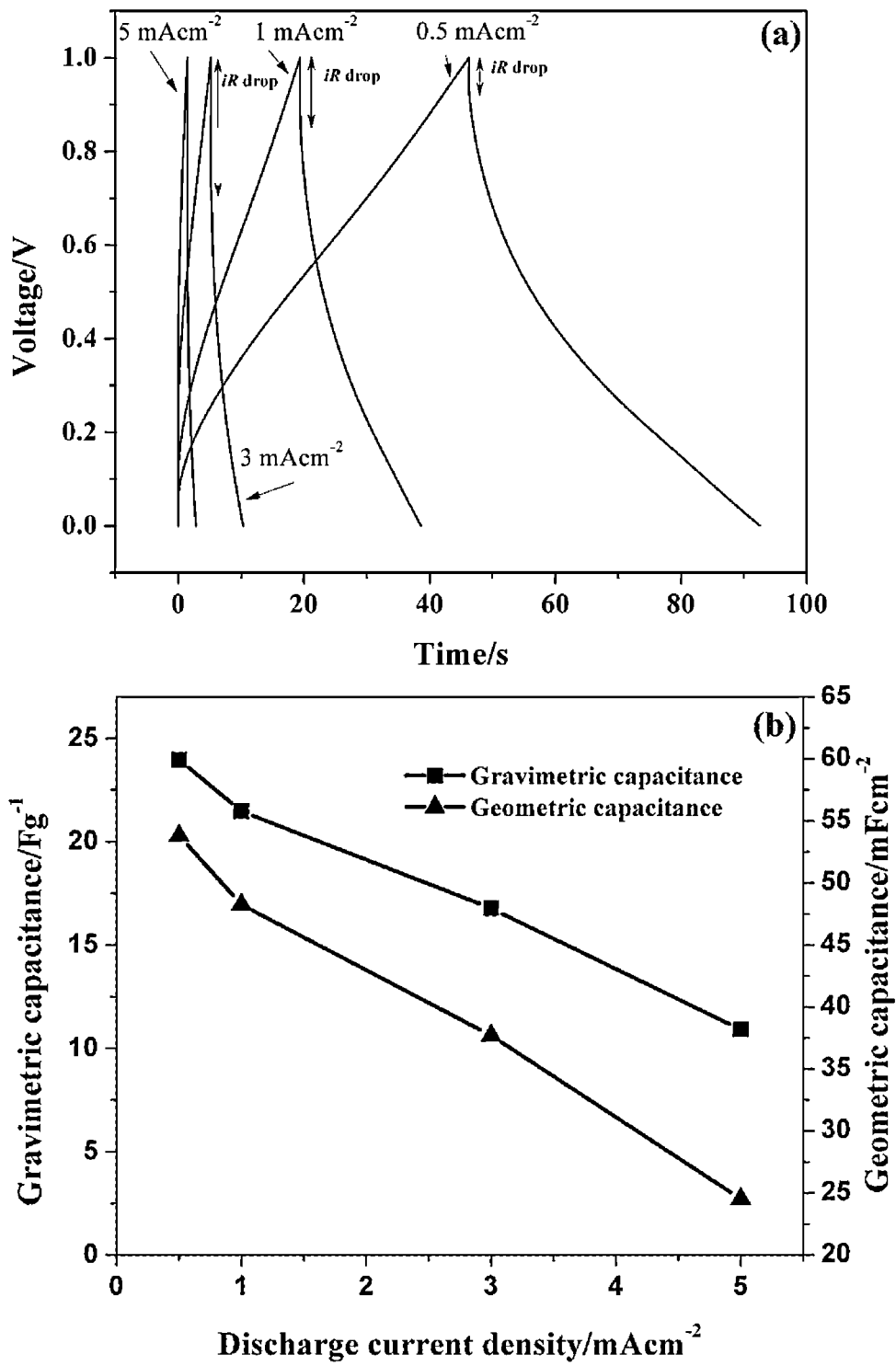
FIG. 6(a) is a graph of galvanostatic charge/discharge curves at various discharge rates.
FIG. 6(b) is a graph of the specific gravimetric and geometric capacitance of activated samples at various discharge rates. The sample was electrochemically activated for 30 min.

The performance of electrochemically activated C-MEMS micro-electrodes were further investigated with galvanostatic charge/discharge experiments were performed on activated samples with various current densities in a voltage range of 0-1.0 V. Examples of charge/discharge curves of the samples activated for 30 min at various discharge current densities are shown in FIG. 6(a). The charging half of each charge/discharge cycles is almost a straight line if excluding the initial iR drop. The discharge curves also have small iR drops at the beginning as shown in FIG. 6(a). After the iR drop, the decrease of voltage with increasing time deviates from a straight line. Deviation from ideality in voltage-time curves has also been observed for electrochemically modified graphite electrodes by Xu et al., 48 Carbon 3293-3311 (2010). Niu et al., 156 J. Power Sources 725-40 (2006) also reported non-linearity in voltage-time curves of porous C-cloth material. While pseudo-capacitive contribution from redox-active surface groups can cause the deviation from linearity in charge/discharge curves, Niu et al. explained that other factors may also contribute to this non-ideal behavior. These factors include redistribution of charge within the pores of activated electrodes during charging or discharging and the effect of direct equivalent series resistance (ESR).

The discharge capacitance of the cell was measured from the discharge curves after the iR drop, according to equation 4:

$$C = I \times \Delta t \times \Delta V^{-1} \qquad \text{Equation 4:}$$

where I is the current, $\Delta t$ is the time interval for the change in voltage range, $\Delta V$. The specific gravimetric and geometric capacitance of the electrodes was calculated using equations 2 and 3, respectively.

FIG. 6(b) shows the variation of the specific gravimetric and geometric capacitance of activated samples at various discharge rates. The geometric capacitance is about 48 mFcm$^{-2}$ at 1 mAcm$^{-2}$. Specific gravimetric capacitance decreases from about 24 Fg$^{-1}$ at 0.5 mAcm$^{-2}$ discharge current density to about 11 Fg$^{-1}$ at 5 mAcm$^{-2}$ discharge current density. These results are in agreement with the above CV results.

Without intending to be bound by theory, it is believed that the improvements in electrochemical performance of activated electrodes can be explained by the following reasons. Firstly, introducing oxygen groups to the surface carbon electrodes is able to improve the wettability of the electrode surface and contribute additional pseudo-capacitance. The appearance of a current maximum on CV curves (FIG. 4a) evidences the existence of oxygen groups on the surface of the electrodes. Secondly, the increase in the surface area of the electrodes after activation seems to be a major reason of enhancement of specific capacitance since the electrochemical pretreatment oxidizes the carbon surface and thus open up the internal closed pores. This activation process may create large and electrochemically accessible internal surface area, which thus increases the double layer capacitance.

Another possible reason for the increase in the capacitance of the electrodes after electrochemical treatment is the irreversible intercalation of ions during polarization. This phenomenon has been observed for graphitizable carbon. It is reported that, during the first polarization cycle ions are inserted into the carbon structure. This intercalation process is irreversible and provides a larger specific capacitance in successive cycles. To investigate intercalation in C-MEMS electrodes, polarization was performed on electrodes for several cycles (between 0 to about −2.5 V). No significant irreversible increase in the capacitance was observed for the C-MEMS electrodes.

Compared to previously published carbon based electrochemical micro-capacitor works, embodiments of the micro-capacitors based on C-MEMS of the disclosure can beneficially exhibit excellent and promising performance. Despite the significant improvement after electrochemical activation, the gravimetric capacitance of the C-MEMS electrode is still lower than that of activated carbon powders with very high BET surface area which is widely used in ECs. It was reported that KOH activated carbon with a BET surface area of 3150 m$^2$g$^{-1}$ shows specific gravimetric capacitance of 312 Fg$^{-1}$ in a 1 M H$_2$SO$_4$ solution. This can be reasonable considering the activation mechanism during electrochemical activation. As mentioned above, it is believed that electrochemical activation forms an active porous film on the surface of the electrode. Braun et at [28] showed that the formation of the active film begins at the outer surface of the carbon and extends into the interior gradually during the activation process, surrounding an inactive core with closed pores. The thickness of the active layer linearly increases with an increase in the activation time as reported by Sullivan et al. [22]. For the activation time of 30 min it may be expected the thickness of the active film is just a few microns. This indicates that a carbon layer with thickness of only a few microns on the surface of carbon posts contribute to the capacitance of electrodes and a large amount of the mass of the electrode is not accessible to the electrolyte. Without intending to be bound by theory, it is believed that by increasing the surface area and decreasing the mass of electrodes through fabrication of high aspect ratio carbon posts, the gravimetric specific capacitance can be improved. Furthermore, as projected from FIG. 4(c) electrochemical activation of electrodes for longer durations could result in a further increase in the specific capacitance of samples. Moreover, based on the proposed model of development of porous structures on the surface of glassy carbon electrodes by Sullivan et al. [22] and Braun et al. [16], it is believed that at the initial stages of activation, the pore entries are too small for the electrolyte to penetrate. As activation advances, pore walls would be thinned, and thus pores will grow in size. Therefore, increasing the activation time can also enhance the accessibility of the pores, which in turn enhances the electrochemical capacitance of the electrodes under high charge-discharge current conditions. Enhancement of the accessibility of the electrolyte will also improve the non-ideal behavior which was observed in the voltage-time curve.

C-MEMS fabricated interdigitated micro-electrodes of embodiments of the disclosure may provide energy storage solutions for micro-devices. Compared to as-prepared electrodes, electrochemical activation of electrodes for 30 min increased the capacity by three orders of magnitude. Fabrication of higher aspect ratio micro-electrodes can increase the surface area of the device in the limited footprint area thus increasing the capacitance normalized by the footprint of the device.

In embodiments of the disclosure, the C-MEMS technique was used to fabricate interdigitated micro-electrode arrays for on-chip electrochemical micro-supercapacitors. Electrochemical characterization of embodiments of the electrochemically activated micro-electrodes showed excellent capacitive behavior. For example, in one embodiment, specific geometric capacitance of about 75 mFcm$^{-2}$ was achieved after electrochemical activation for 30 min. For this activation duration the volumetric capacitance was about 48 Fcm$^{-3}$. These results indicate that the C-MEMS technique is a very promising method for the fabrication of electrochemical micro-supercapacitors.

Figure 7:
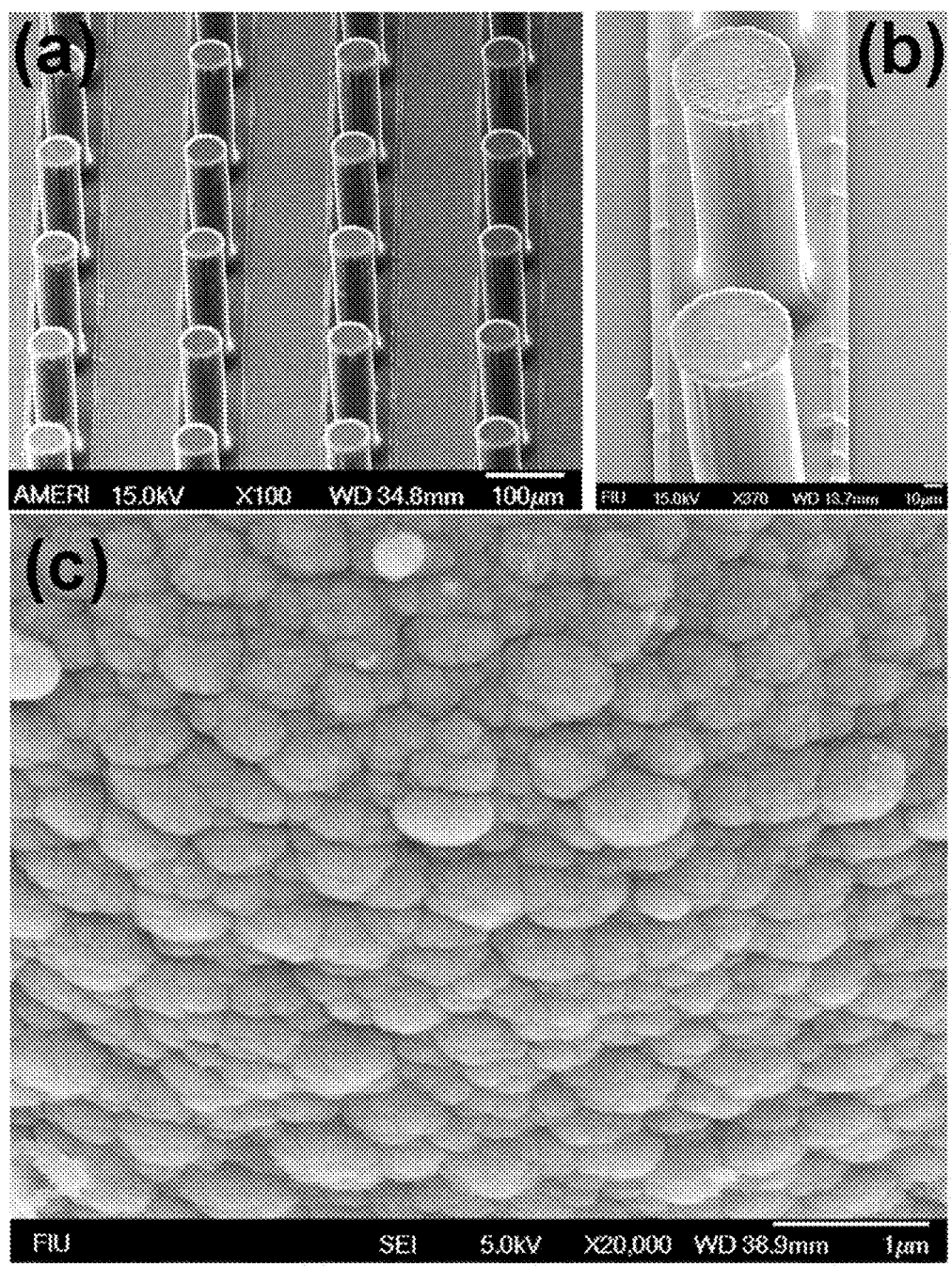
FIG. 7a is a scanning electrode microscopy image of as-pyrolyzed C-MEMS electrodes FIG. 7b a scanning electrode microscopy image of electrochemically deposited polyprrole on C-MEMS electrode in accordance with an embodiment of the disclosure.
FIG. 7c is a high magnification image from the wall of a carbon post showing nanostructure of PPy film
Figure 8:
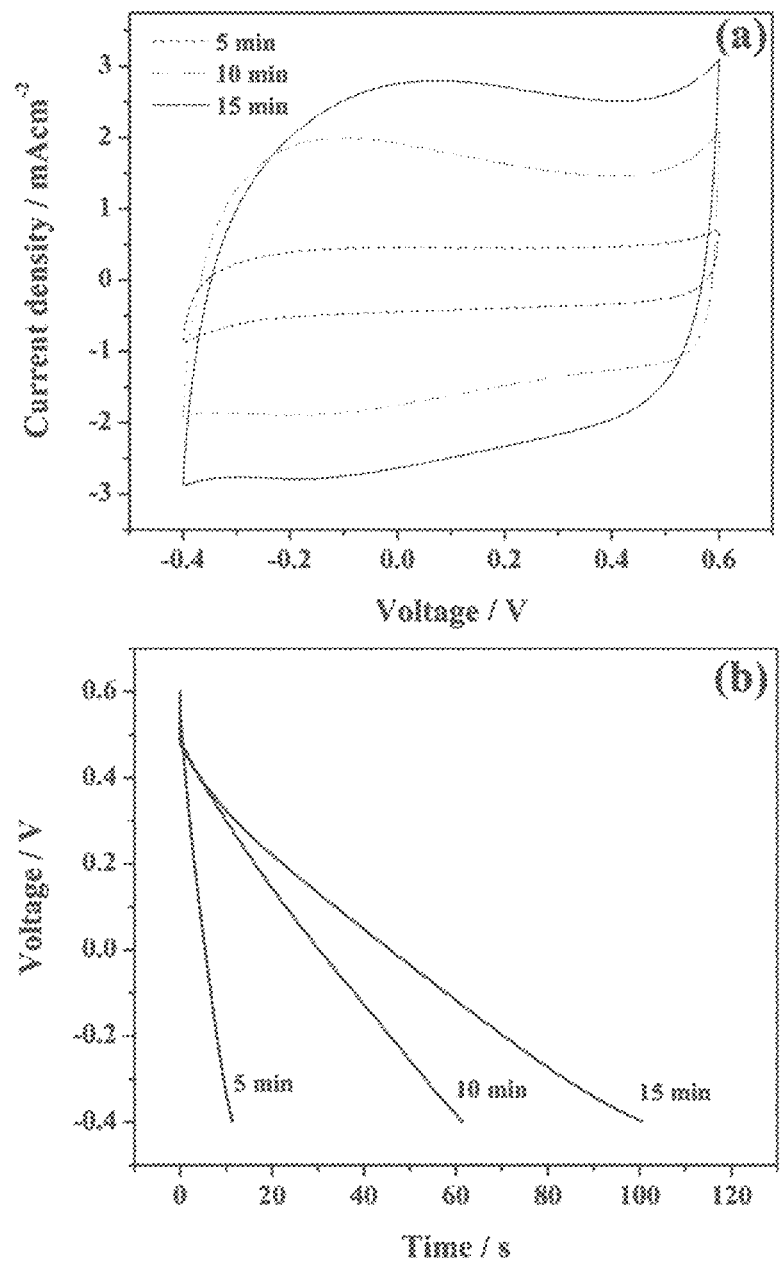
FIG. 8a is a graph of CV curves of polypyrrole coated C-MEMS single electrodes with different electropolymerization time at 20 $mVs^{-1}$ scan rate in accordance with an embodiment of the disclosure.
FIG. 8b is discharge curves of polypyrrole coated C-MEMS single electrodes at 1 $mAcm^{-2}$ discharge current density
Figure 9:
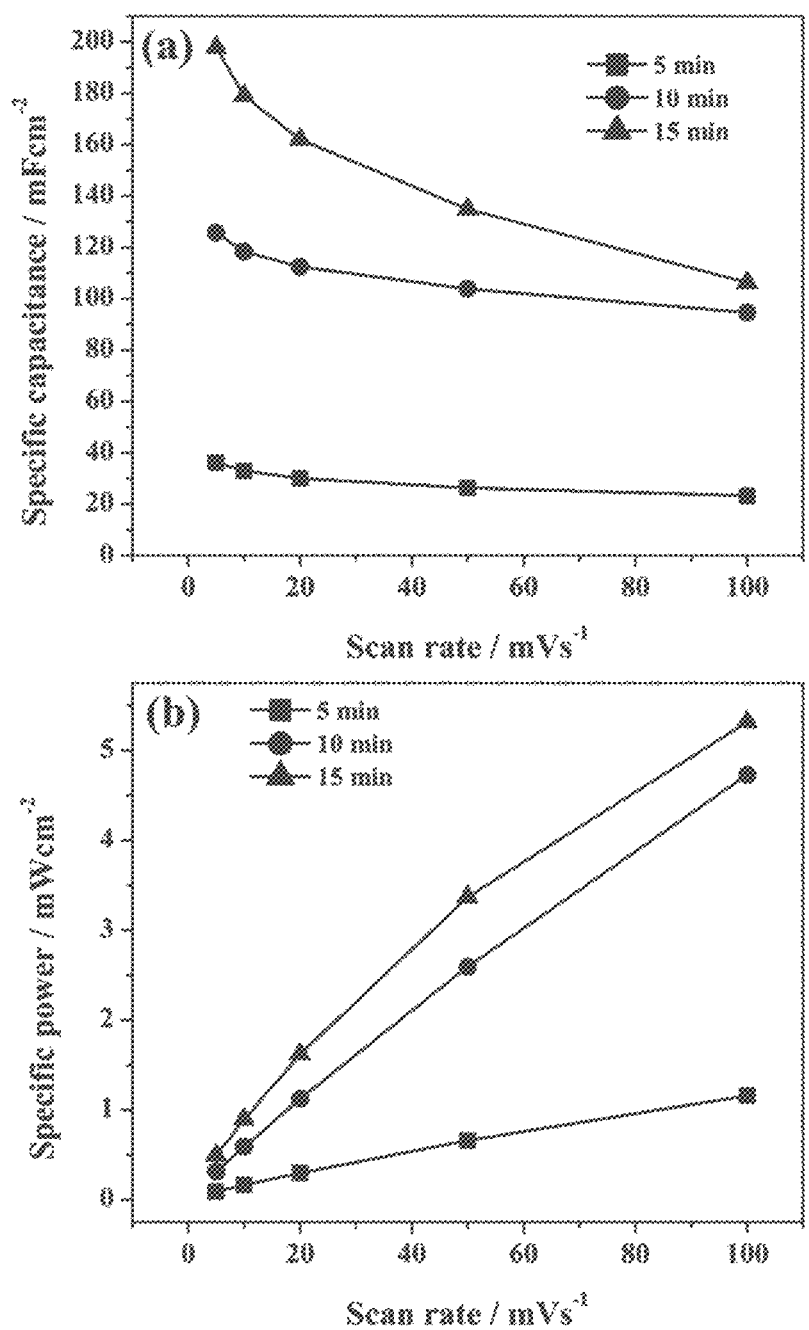
FIG. 9 is (a) Specific capacitance and (b) specific power of three single PPy/C-MEMS electrodes polymerized for 5, 10 and 15 minutes at different scan rates.
Figure 10:
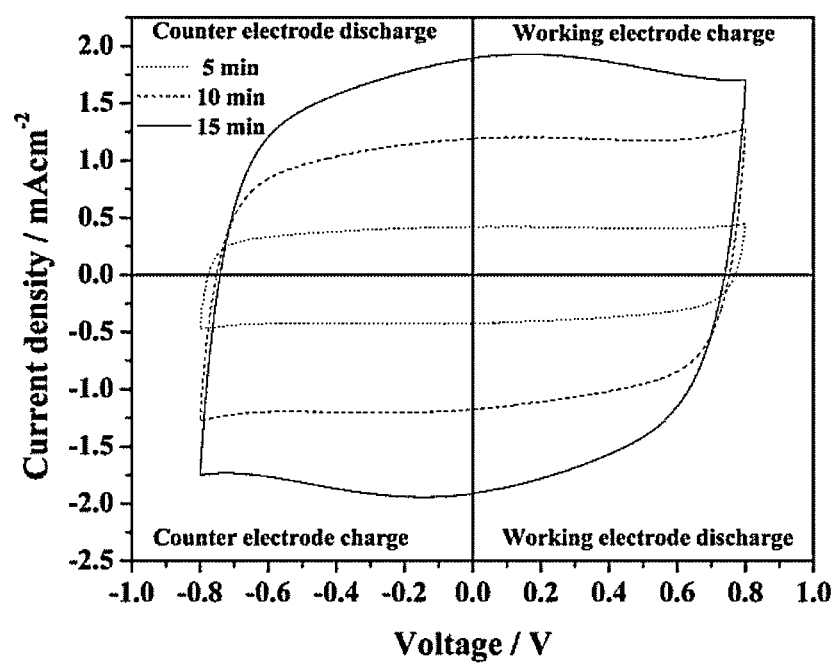
FIG. 10 is graph of the CVs of full cell polypyrrole coated C-MEMS electrodes with different polymerization time electrodes in accordance with an embodiment of the disclosure at different scan rates.
Figure 11:
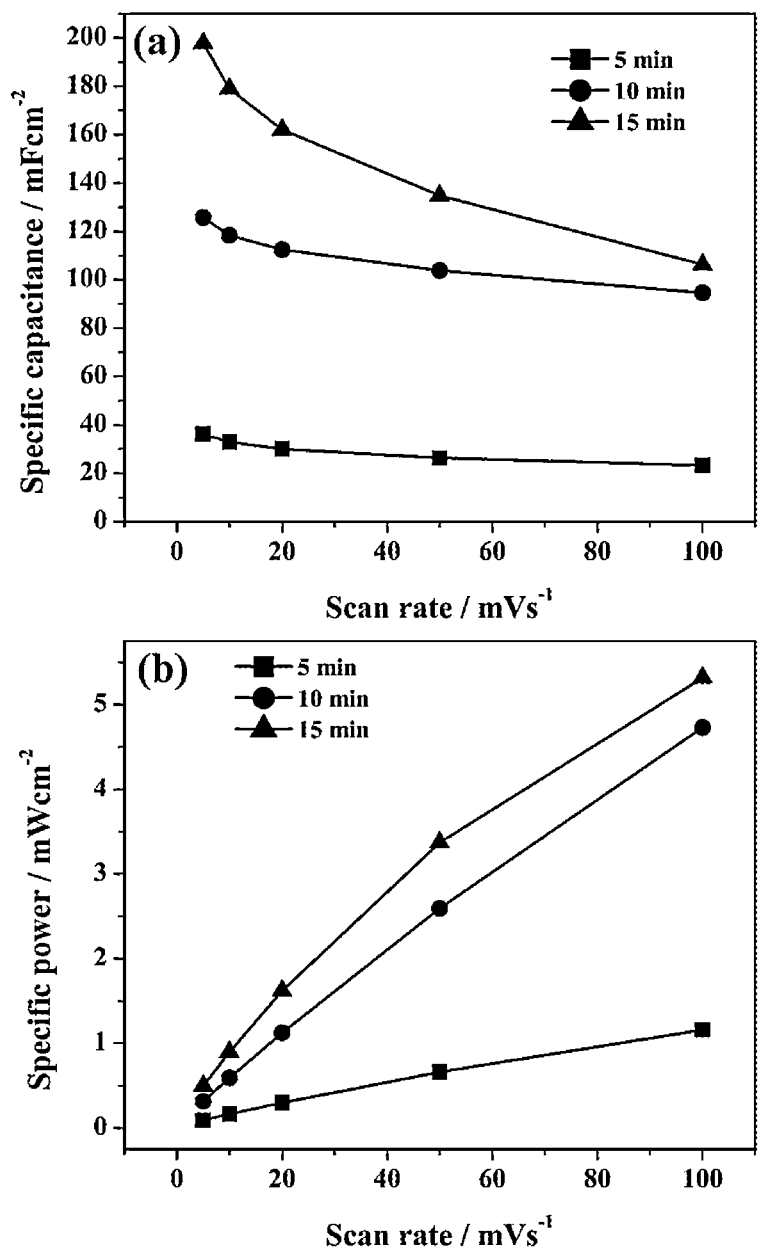
FIG. 11 is a graph of charge/discharge curves of full cell polypyrrole coated C-MEMS electrodes in accordance with an embodiment of the disclosure.
Figure 12:
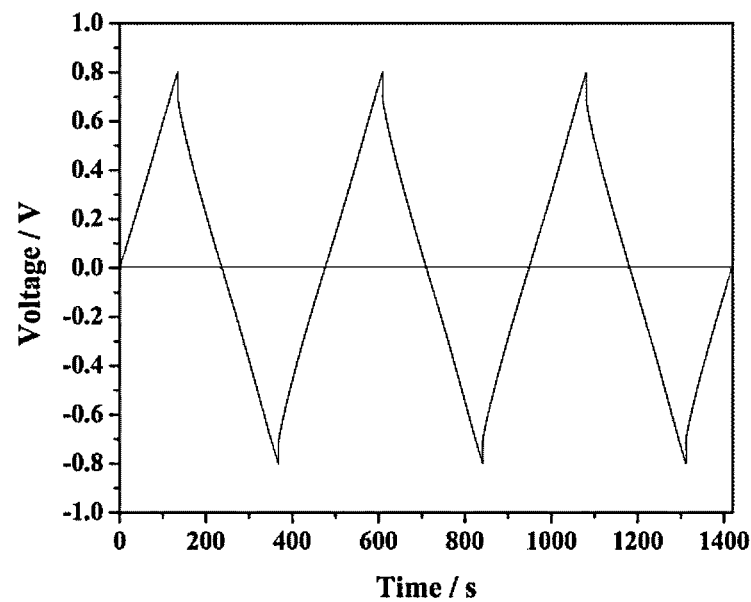
FIG. 12 is a graph comparing the specific capacitance of conventional polypyrrole coated carbon films and polypyrrole coated three-dimensional C-MEMS electrodes in accordance with an embodiment of the disclosure at different polypyrrole deposition times.
Figure 12:
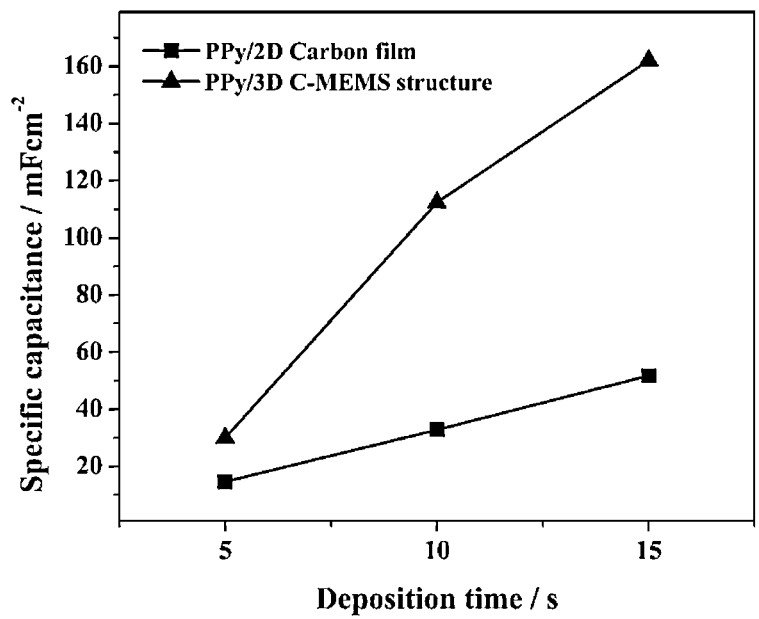

Electrically conducting polymers such as polyaniline, polythiphene, polypyrrole, and their derivatives can be used as electrode-active materials for supercapacitors. In accordance with embodiments of the disclosure C-MEMS structures can be employed as three-dimensional current collectors for electrically conducting polymer symmetric micro-supercapacitors, for example, polypyrrole symmetric micro-supercapacitors. The polymer can be deposited on the C-MEMS interdigitated three-dimensional electrodes. For example, a conformal coating of the polymer can be formed on the C-MEMS electrode. As compared to bare C-MEMS electrodes, embodiments of the polymer coated C-MEMS electrodes, and in particular, polypyrrole coated C-MEMS electrodes, can exhibit superior specific capacitance. Additionally, three dimensional structure electrodes can provide a more effective surface area as compared to conventional thin film electrodes. Embodiments of the polypyrrole coated C-MEMS in accordance with disclosure showed higher specific capacitance as compared to two-dimensional electrodes. FIG. 7 illustrates electrochemically deposited polypyrrole on C-MEMS electrodes. FIGS. 8-12 illustrate the effects of different experimental parameters on the performance of the microsupercapacitors cells by cyclic voltammetry and galvanostatic charge-discharge experiments. Other conducting polymers contemplated include polyacetylene (PAC), polyphenylene vinylene (PPV), polythiophene (PT), polyphenylene sulfide (PPS), poly(3,4-ethylenedioxythiophene) (PEDOT), polypyrole (PPY), polyaniline (PANI), and combinations thereof.

Deposition of Graphene

The recent development in miniaturized electronic devices has increased the demand for power sources that are sufficiently compact and can potentially be integrated on a chip with other electronic components. Miniaturized electrochemical capacitors (EC) or micro-supercapacitors have great potential to complement or replace batteries and electrolytic capacitors in a variety of applications.[32-41] Among all the desired properties of a micro-supercapacitor device, high power density and more importantly high frequency response and rate capability are crucial for their future applications. These properties are particularly important if the micro-supercapacitors were to be coupled with micro-batteries, micro-fuel cells, and energy harvesters to provide peak power; or if they were to replace electrolytic capacitors in applications such as filtering voltage ripples in line-powered electronics (ac line-filtering).[42] Achieving a high frequency response and rate capability is dependent on the various constituents of a supercapacitor including the electrode materials, electrolyte, the method of assembly of materials on the current collectors, and the architecture of the device.

ECs are categorized into two types based on their energy storage mechanism, electrical double-layer capacitors (EDLCs) and pseudo-capacitors. EDLCs store charge by adsorption of electrolyte ions on the surface of an electrode with high specific surface area. Different types of high surface area carbon materials are usually used as electrode materials for EDLCs. Pseudo-capacitors store charge by faradic reactions that takes place on the surface or sub-surface of the electrodes. Metal oxides such as Manganese oxide[33] and conducting polymers such as Polypyrrole (PPy)[34] and Polyaniline (PANI)[35] are widely reported as pseudo-capacitive materials. Although pseudo-capacitive materials show promising volumetric capacitance, the slow charge storage mechanism immensely impacts their frequency response and rate handling capabilities. Carbon nanomaterial such as, activated carbon (AC),[36] carbide derived carbon (CDC),[37,38] onion-like carbon (OLC),[39] carbon nanotube (CNT),[40] and graphene[41] have been used to fabricate EDLC micro-supercapacitors. Micro-supercapacitors based on AC show medium stack capacitance, however due to the use of polymeric binders and limited ion transfer in the porous network of the electrode materials, AC micro-supercapacitors show relatively poor frequency response.[36] The CDC based micro-supercapacitors show high volumetric capacitance at low scan rates (about 180 $Fcm^{-3}$ volumetric capacitance of one electrode at 20 $mVs^{-1}$), however the capacitance drops to almost half of its initial value by increasing the scan rate to 500 $mVs^{-1}$, suggesting the poor rate handling capability of these micro-supercapacitors.[38] Among all the reported EDLC micro-supercapacitors, those based on OLCs are particularly notable as they offer ultra-high power handling capability with a resistance capacitance (RC) time constant of only 26 ms.[39] The combination of micrometer-sized interdigital electrode design with a binder free deposition technique and the non-porous morphology of OLC materials was responsible for the excellent frequency response of OLC based micro-supercapacitors. The drawback of OLC based micro-supercapacitors is their modest specific capacitance (1.7 $mFcm^{-2}$) and their high temperature processing requirements (~1800° C.).[39]

Graphene has recently become a material of interest in supercapacitor application due to its high theoretical surface area and electrical conductivity.[42-45] Miller and coworkers[42] demonstrated that vertically oriented graphene grown on nickel foam has excellent frequency response with an RC time constant of less than 0.2 ms. However, this was achieved at the cost of low specific capacitance resulting from the low density of electrode materials.[42] The performance of graphene-based supercapacitor materials is usually hindered by the fact that graphene sheets tend to aggregate and restack during processing and the actual accessible surface area of the electrodes is much lower compared to the theoretical surface area (more than 2600 $m^2g^{-1}$). One of the effective strategies to avoid this problem is the addition of spacers such as carbon nanotubes (CNTs) between graphene sheets to prevent their restacking.[46-48] Another interesting approach to increase the accessibility of electrolyte ions to graphene sheets is the approach reported by Yoo and coworkers[49] where the in-plane design of the two supercapacitor electrodes resulted in a dramatic increase in capacitance compared to the conventional 2D stacking of the electrodes. The authors suggested that the in-plane design will increase the accessibility of ions to the surface of the graphene sheets and thus improve the capacitive properties.[49] It can be anticipated that the efficiency of the in-plane design of the electrode can be increased if the electrodes were made in micro-meter scale sizes. There have been some efforts to utilize graphene as electrode material for micro-supercapacitors. Gao et al.[41] reported a direct write process to fabricate micro-supercapacitors with interdigital electrode design and hydrated graphene oxide (GO) as the electrolyte and separator. While the fabrication method is promising, the electrodes demonstrated in this work was fabricated in millimeter scales with the maximum capacitance of only 0.51 $mFcm^{-2}$ for an in-plane design of electrodes. It remains a challenge to develop micron-size patterned graphene electrodes through a scalable and reliable fabrication method.

Disclosed herein are ultra-high power micro-supercapacitors based on binder-free reduced graphene oxide (rGO) and rGO/CNT hybrid as electrode materials. The micro-supercapacitors with interdigital microelectrodes (100 μm width and 50 μm spacing) are readily fabricated through the combination of electrostatic spray deposition (ESD) and photolithography lift-off. We first demonstrate that ESD can be used for simultaneous deposition and reduction of GO. Next, in order to maximize the accessibility of electrolyte ions to electrode materials, we demonstrate the effects of the addition of CNTs between rGO sheets when integrated in micron-sized in-plane electrodes. The electrochemical properties of micro-supercapacitors were examined by cyclic voltammetry (CV), galvanostatic charge-discharge (CD), and electrochemical impedance spectroscopy (EIS). The micro-supercapacitors show exceptionally high rate capability and power handling performance and can be charged and discharged at CV scan rate of 50 Vs$^{-1}$ and CD rate of 100 mAcm$^{-2}$ (~450-600 Ag$^{-1}$). These rates are about three orders of magnitude higher than the charge and discharge rates of conventional supercapacitors. EIS measurements show very high frequency response of the micro-supercapacitors with characteristic frequencies as high as 290.76 Hz, higher than the recently reported state of the art micro-supercapacitors.

Figure 13:
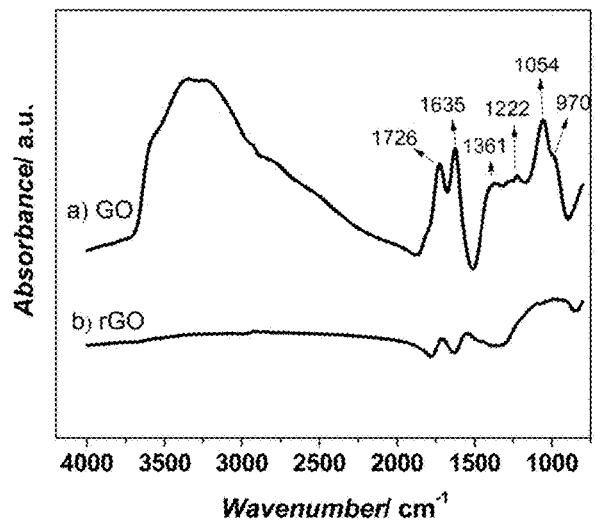
FIG. 13 is a graph showing FTIR absorpance spectra of (a) as-purchased GO powder and (b) ESD deposited rGO.

A homogeneous and stable solution of GO in 1,2 propanediol was used as the precursor solution for ESD deposition of GO on preheated (250° C.) substrates. The studies of the surface chemistry of deposited films with Fourier Transform Infrared Spectroscopy (FTIR) and X-ray photoelectron spectroscopy (XPS) show that the GO reduced to rGO during the deposition. The FTIR Spectra of GO before and after deposition are shown in FIG. 13. The broad adsorption peak centering at around 3300 cm$^{-1}$ in the spectrum of GO is assigned as isolated hydroxyl groups and water, which also signals an H—O—H bending at 1635 cm$^{-1}$.[50,51] The peak at 1054 cm$^{-1}$ is consistent with C—O stretching vibration. The presence of phenol and carboxylic acid groups was signaled by the phenolic C—O peak at 1222 cm$^{-1}$ and the mode at 1726 cm$^{-1}$ which is assigned to C=O stretching vibrations from carbonyl and carboxylic groups. Based on the structural model of GO, these groups are placed on the periphery of GO sheets.[51,52] The spectrum also shows the presence of epoxy C—O (970 cm$^1$) and O—H bending in tertiary alcohol (1361 cm$^{-1}$) groups which are reported to be located on the basal plane of GO.[51,52] After the deposition, the intensities of modes from water and oxygen functionalities were significantly reduced. The FTIR spectrum of deposited rGO shows mainly bands originating from C—O stretching, phenolic C—O stretching and C=O stretching while the signals from tertiary alcohol and epoxy C—O on the basal plane of GO disappeared after deposition. The FTIR analysis suggests that the remaining oxygen groups after reduction are the functional groups that are mainly attached to the periphery of rGO sheets.[51,52]

Figure 14:
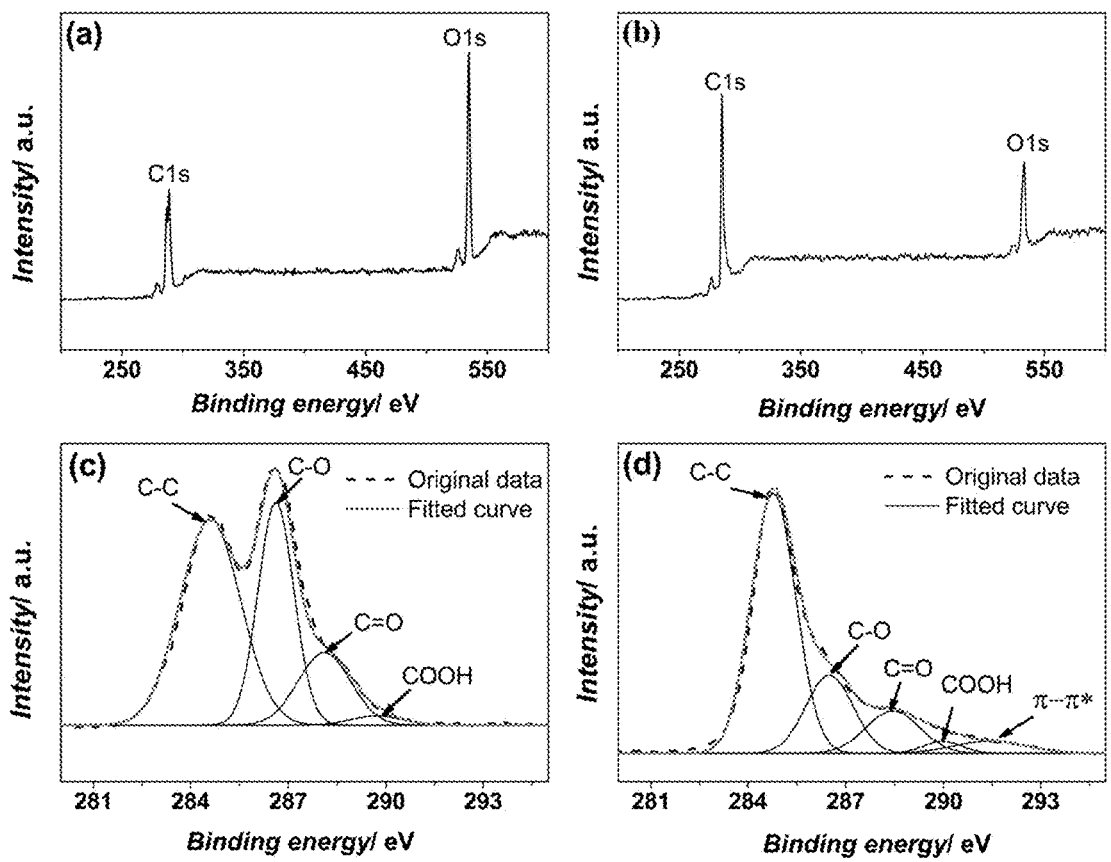
FIG. 14 shows wide-range XPS spectra of (a) GO and (b) rGO. The C1s spectra were deconvoluted into their corresponding components using a Gaussian function for (c) GO and (d) rGO.

The surface chemistry of GO and the as-deposited rGO were studied by X-ray photoelectron spectroscopy (XPS). The XPS spectra of GO and rGO are shown in FIG. 14a,b. The O1s peak intensity has decreased for deposited rGO and the overall C/O ratio has increased to 5.75 compared to 1.77 for the GO powder. This seemingly mediocre increase in C/O ratio represents a large decrease in oxygen content (~70%) on the surface rGO sheets. The C1s spectrum of GO can be deconvoluted to four components corresponding to four types of carbon bonds within GO. The peaks centered at 284.6, 286.6, 288.1 and 289.7 eV, correspond to C—C in aromatic rings, C—O (epoxy and alkoxy), C=O (carbonyl and carboxylic) and COOH groups, respectively.[50,51,53] The C1s spectrum of rGO shows all these four peaks with different proportions. The proportion of C—C bond has increased from 50% for GO to about 61% for deposited rGO. The proportion of the peak corresponding to C—O groups (286.6 eV) has decreased after the deposition. The proportion of C—O groups is 32% for GO and about 19% for the rGO. The remaining C—O groups should correspond to peripheral phenolic and carboxyl functionalities. The proportion of the C=O groups shows a slight decrease after deposition, from 15% for GO to 12% for rGO. In addition to these four peaks, a π-π* shake up satellite peak was observed for rGO at around 291.4 eV. This is a characteristic of aromatic or conjugated systems which indicates that there are less defects in the structure of rGO after the deposition.[53,54] The XPS results confirm the FTIR results and show the reduction of GO after the ESD deposition. This is in agreement with previous studies regarding the reduction of GO at low temperatures (150-250° C.) in air or in organic solvents.[50,55] The remaining oxygen content after the reduction should correspond to phenolic, carbonyl, and carboxyl groups in the periphery of deposited rGO sheets.[51]

Figure 15:
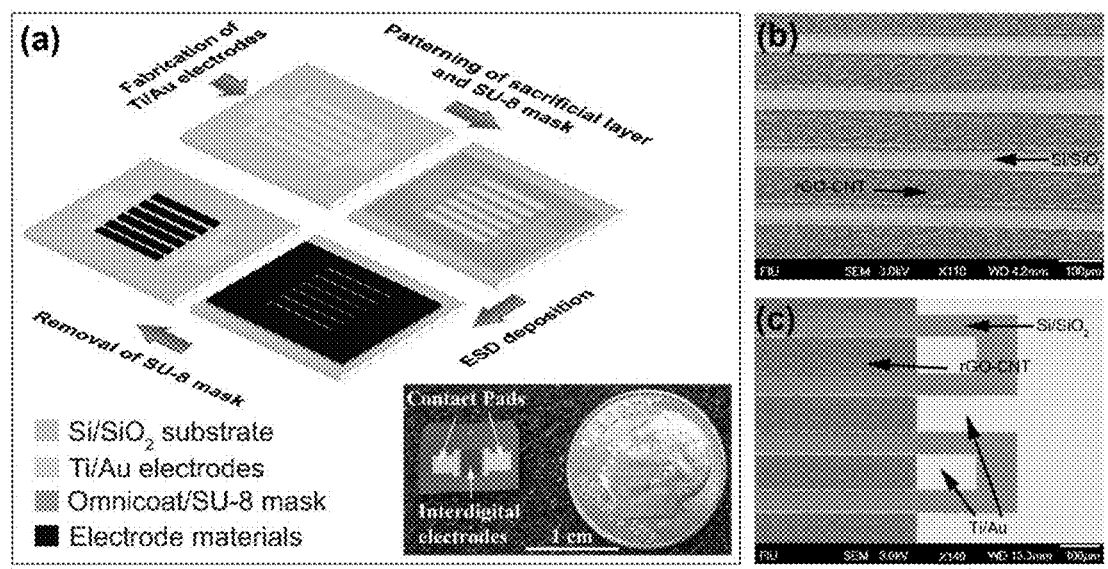
FIG. 15 shows (a) a schematic drawing of fabrication procedures of micro-supercapacitors (inset shows a digital photograph of a fabricated device), and (b) and (c) top view SEM micrographs of rGO-CNT based interdigital micro-electrode arrays.

FIG. 15a schematically shows the procedure used to integrate electrode materials on interdigital Ti/Au microelectrodes to fabricate micro-supercapacitors. Before the ESD deposition, the working area of the microelectrodes was defined by a removable microfabricated photoresist mask that covers the contact pads and the space between the microelectrodes. After the deposition and removal of the mask, a micro-supercapacitor with 20 in-plane interdigital microelectrodes (10 positive and 10 negative microelectrodes) was constructed. Each microelectrode was 100 µm in width and 2500 µm in length and the distance between adjacent microelectrodes were 50 µm. The samples labeled as rGO and CNT were fabricated from the deposition solution containing 100% GO and 100% CNT, respectively. The samples labeled as rGO-CNT-9-1 and rGO-CNT-8-2 had GO:CNT weight ratios of 9:1 and 8:2, respectively. The thicknesses of all electrodes were kept around 6 µm by adjusting the deposition rate for each type of electrode materials. FIG. 15b,c show the scanning electron microscopy (SEM) micrographs of a typical fabricated micro-supercapacitor. The microelectrodes had well-defined and defect-free patterns and no short circuit between the electrodes was detected.

Figure 16:
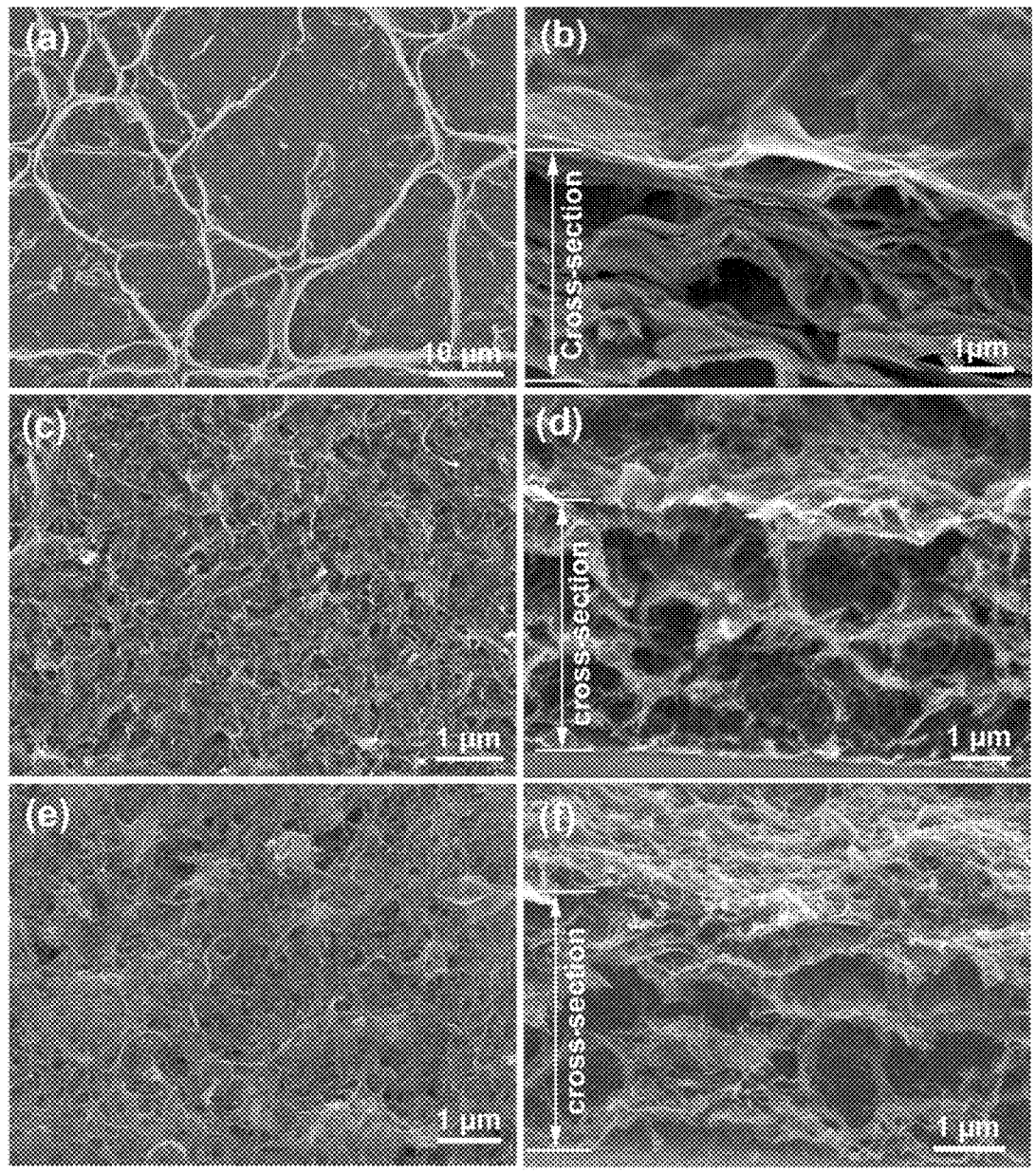
FIG. 16 shows scanning electron micrographs showing the morphology of the deposited electrodes: Top view and tilted 35° view of (a) and (b) rGO micro-electrodes, (c) and (d) rgO-CNT-9-1 micro-electrodes, and (e) and (f) rGO-CNT-8-2 micro-electrodes.

The microstructure of deposited rGO microelectrodes (FIG. 16a) showed stacked layers of graphene sheets with micron-sized wrinkles that are probably the result of GO sheets bending during the deposition. FIG. 16b, a tilted view from the side of an interdigital electrode, shows the local folding and non-uniform stacking of the rGO layers. Several to hundreds of stacked graphene sheets can be observed locally with extended irregular porous structures, which could act as diffusion channels and facilitate easy penetration of ions in the bulk of the microelectrodes. However, heavily stacked rGO sheets could prevent the full access of electrolyte ions to the surface rGO sheets. FIG. 16c-f show the SEM images of rGO-CNT hybrid electrodes. The tilted view SEM images clearly show uniformly packed film with the appearance of CNTs between the rGO sheets throughout the thickness of deposited films with almost no sign of stacked rGO sheets.

Figure 17:
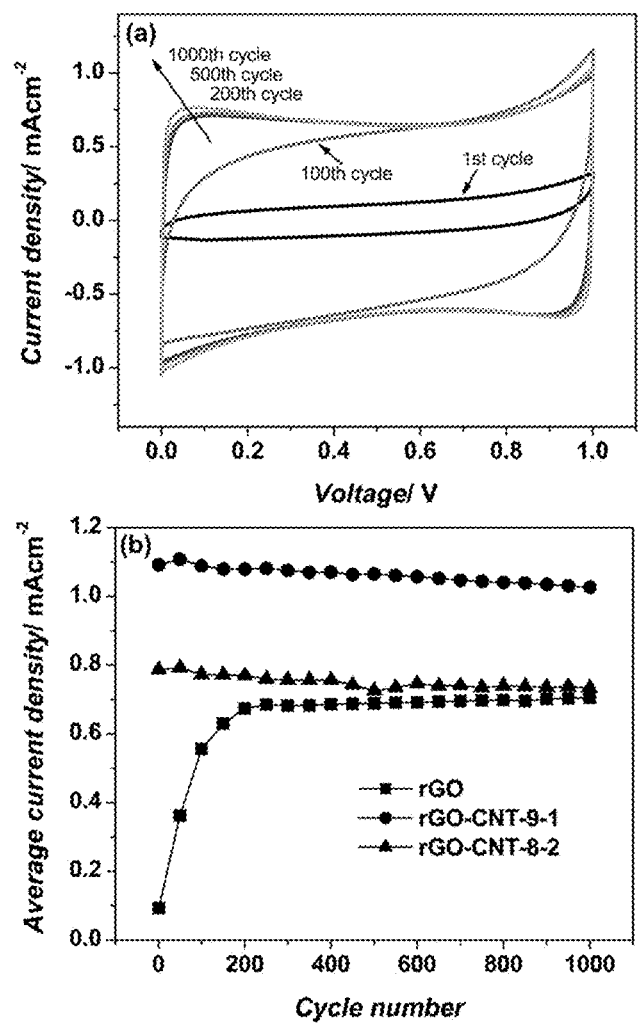
FIG. 17 shows (a) CV curves at various cycles of a rGO micro-supercapacitors tested at 0.1 $Vs^{-1}$ scan rate. (b) Variation of average CV current density with cycle number for rGO, rGOCNT-9-1 and rGO-CNT-8-2.

In order to study the electrochemical performance of fabricated micro-supercapacitors, CV was conducted in 3 M KCl aqueous electrolyte and at the potential range of 0 to 1V. During the initial CV cycles of the rGO micro-supercapacitor at a 0.1 Vs$^{-1}$ scan rate, the CV current during cycling constantly increased up to 200 cycles, with the average current density increasing by more than 7 times compared to the first cycle (FIG. 17a). After about 200 cycles the rate of the increase in average current dropped and for the following cycles up to the 1000$^{th}$ cycle, an increase of less than 5% in current density was noted (FIG. 17a,b). A similar phenomenon has been reported by Cheng et al. during long time cycling of graphene electrodes and was referred to as "electro-activation".[46] The authors detected a 60% increase in specific capacitance of pristine graphene electrodes during longtime cycling. It was suggested that the intercalation of electrolyte ions between the graphene sheets increases the spacing between the sheets and therefore increases the accessibility of ions to the surface of graphene. It should be noted that the effect of electro-activation is much more pronounced in the case of the interdigital rGO electrodes compared to the planar electrodes reported by Cheng and coworkers.[46] In general, the in-plane design of the graphene electrodes increases the accessibility of ions in between graphene electrodes.[49] In the case of rGO micro-supercapacitors, in addition to the side by side design of the electrodes, the smaller size of the electrode and the shorter distance between them further facilitate the accessibility of ions to the graphene sheets, resulting in a more efficient electro-activation. In contrast to the rGO microdevice, the average CV current density of rGO-CNT micro-supercapacitors did not increase during the cyclic test for 1000 cycles showing that the electro-activation did not occur in the case of these microdevices (FIG. 17b). This observation leads us to conclude that the addition of CNTs had effectively prevented the restacking of rGO sheets and thus the intercalation of ions during cycling could not further increase the spacing between the rGO sheets. Furthermore, the microdevices with hybrid rGO-CNT electrodes show higher CV current density, implying that compared to electro-activation, using CNTs as a spacer between graphene sheets is a more effective way to increase the accessible surface area of the electrodes.

The rate capability and power handling of the micro-supercapacitors was tested by CV at very high scan rates (1 to 50 $Vs^{-1}$). Before performing the tests at higher scan rates, each microdevice was cycled for 250 cycles at 0.1 $Vs^{-1}$ to ensure that the CVs were stable and in the case of the rGO microdevices the electro-activation was completed. FIG. 18a-e show the CV curves of rGO, rGO-CNT-9-1 and rGO-CNT-8-2 microdevices at different scan rates. The rGO micro-supercapacitor showed near rectangular CV curves, which is typical of EDLCs, at scan rates of 1 and 5 $Vs^{-1}$. Upon increasing the scan rate to 10 $Vs^{-1}$, the CV curve deviated from a rectangular shape which indicates a more resistive behavior. At much higher scan rates of 25 and 50 $Vs^{-1}$, the rGO microdevice still showed some capacitive behavior, but the resistive behavior was dominant and the capacitance dropped quickly at these scan rates. In the case of microdevices with rGO-CNT electrodes, the CV curve showed a rectangular shape with pure capacitive behavior even at a very high scan rate of 50 $Vs^{-1}$.

Figure 18:
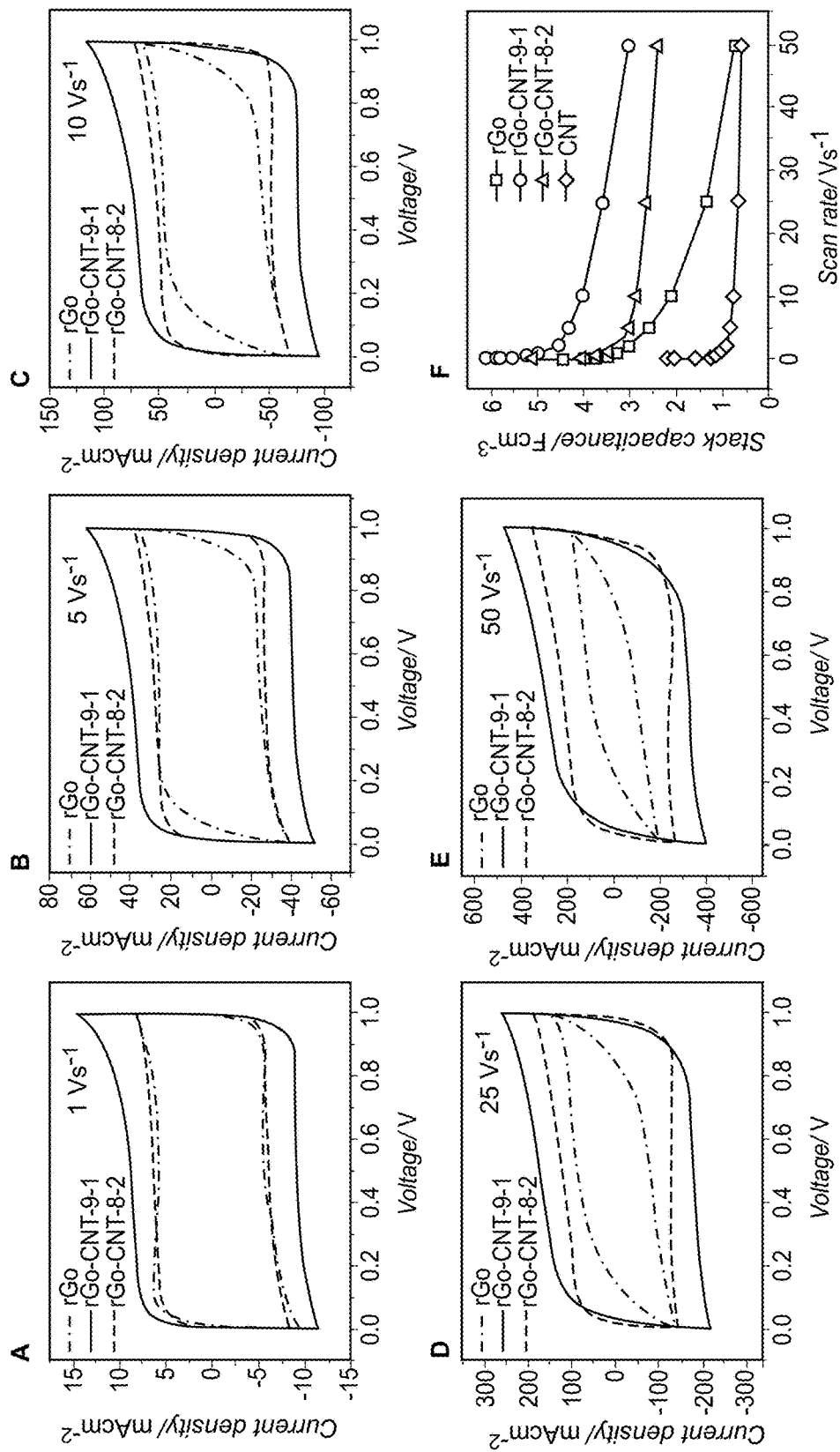
FIG. 18 shows CV curves of rGO, rGO-CNT-9-1 and rGO-CNT-8-2 micro-supercapacitors at scan rate of a) 1 $Vs^{-1}$, b) 5 $Vs^{-1}$, c) 10 $Vs^{-1}$, d) 25 $Vs^{-1}$, and e) 50 $Vs^{-1}$. f) Comparison of stack capacitances of micro-supercapacitors with different electrode compositions.

The stack capacitance (volumetric capacitance) of the micro-supercapacitors were calculated from the CV curves at various scan rates and by taking into account the volume of both electrodes and the space between them (FIG. 18f). As suggested by Gogotsi and Simon,[56] the volumetric or areal capacitance or energy density are much more reliable performance metrics for supercapacitor devices compared to gravimetric capacitance. This is more pronounced in the case of microdevices as the weight of the material of a thin film electrode on a chip is negligible.[56] As it is evident from FIG. 18e, all micro-supercapacitors with different compositions showed capacitive behavior even at a very high scan rate of 50 $Vs^{-1}$. However, the rGO-CNT micro-supercapacitors showed better performance in terms of capacitance and rate capability. The rGO micro-supercapacitor showed a stack capacitance of about 4.43 $Fcm^{-3}$ (~27.2 $Fcm^{-3}$ volumetric capacitance of one electrode) at a scan rate of 0.01 $Vs^{-1}$ which dropped to 3.2 $Fcm^{-3}$ at a 1 $Vs^{-1}$ scan rate. At a higher scan rate of 50 $Vs^{-1}$, the stack capacitance decreased to 0.7 $Fcm^3$ (~4.4 $Fcm^3$ volumetric capacitance of one electrode). This value at a 50 $Vs^{-1}$ scan rate is about 16% of the initial stack capacitance recorded at a 0.01 $Vs^{-1}$ scan rate. The rGO-CNT-9-1 micro-supercapacitor showed the highest stack capacitance at all CV scan rates. At the low scan rate of 0.01 $Vs^{-1}$, the stack capacitance was about 6.1 $Fcm^{-3}$ which is equivalent to 37.5 $Fcm^3$ volumetric capacitance of one electrode. When the scan rate was increased to 1 $Vs^{-1}$ the stack capacitance dropped to about 5 $Fcm^{-3}$. At the scan rate of 50 $Vs^{-1}$ the stack capacitance was about 3.1 $Fcm^{-3}$ which is 50% of its value at the 0.01 $Vs^{-1}$ scan rate and 62% percent of its value at the 1 $Vs^{-1}$ scan rate. The rGO-CNT-8-2 micro-supercapacitor showed a stack capacitance of about 2.4 $Fcm^{-3}$ at a scan rate of 50 $Vs^{-1}$ which is 46% of the capacitance at a 0.01 $Vs^{-1}$ scan rate (5.2 $Fcm^{-3}$) and 70% of the capacitance at the scan rate of 1 $Vs^{-1}$ (3.4 $Fcm^3$). The lower capacitance of rGO-CNT-8-2 micro-supercapacitors could be explained by the effect of additional CNT which has lower capacitance compared to rGO sheets (FIG. 18f). However, the lower drop in stack capacitance of rGO-CNT-8-2 micro-supercapacitors (30%) compared to the rGO-CNT-9-1 micro-supercapacitor (38%) upon increasing the scan rate from 1 to 50 $Vs^{-1}$ indicates that additional CNT has improved the rate capability of the microdevice. The micro-supercapacitor based on 100% CNT shows much lower capacitance compared to rGO and rGO-CNT micro-supercapacitors at all scan rates (FIG. 18f). The areal specific capacitance of the rGO-CNT-9-1 microdevice (calculated by taking into account the total area of both electrodes) is about 2.8 $mFcm^{-2}$ at a 50 $Vs^{-1}$ scan rate. The significance of the electrochemical properties of the rGO-CNT micro-supercapacitors can be further revealed when they are compared to the performance of other reported micro-supercapacitors. Even at a high scan rate of 50 $Vs^{-1}$ the rGO-CNT micro-supercapacitors showed higher specific capacitance compared to the majority of reported EDLC micro-supercapacitors (specific capacitance of 0.4-2 $mFcm^{-2}$ at very low CV scan rates of 0.01 to 0.1 $Vs^{-1}$).[36,40,41,57] Some other reported EDLC micro-supercapacitors such as graphene-cellulose paper supercapacitors and CDC micro-supercapacitors show higher specific capacitance but poor rate capability and frequency response.[38,58] Finally, the high power OLC based micro-supercapacitors reported by Pech et al.[39] shows similar high rate capability but has lower capacitance compared to rGO-CNT micro-supercapacitors. For instance, a stack capacitance of about 0.9 $Fcm^{-3}$ was measured at a 50 $Vs^{-1}$ scan rate for OLC based micro-supercapacitors (see Table 1 for a more detailed comparison of different EDLC micro-supercapacitors).

The electrochemical performance of micro-supercapacitors was further studied by CD at different current densities and EIS. The CD curves showed triangular shapes, typical of EDLC supercapacitors, with a very low iR drop even at a very high current density of 60 $mAcm^{-2}$ (FIG. 19a). The iR drop, the sudden voltage drop at the beginning of the CD discharge, is a measure of the overall resistance of the cell and since its value is proportional to discharge current, the small iR drop of the micro-supercapacitors at a high discharge current indicates a very low cell resistance for all the tested micro-supercapacitors. The iR drop slightly decreased with an increase in the amount of CNTs in the electrodes and its value was 0.024, 0.013 and 0.010 V for rGO, rGO-CNT-9-1, and rGO-CNT-8-2 micro-supercapacitors, respectively.

Figure 19:
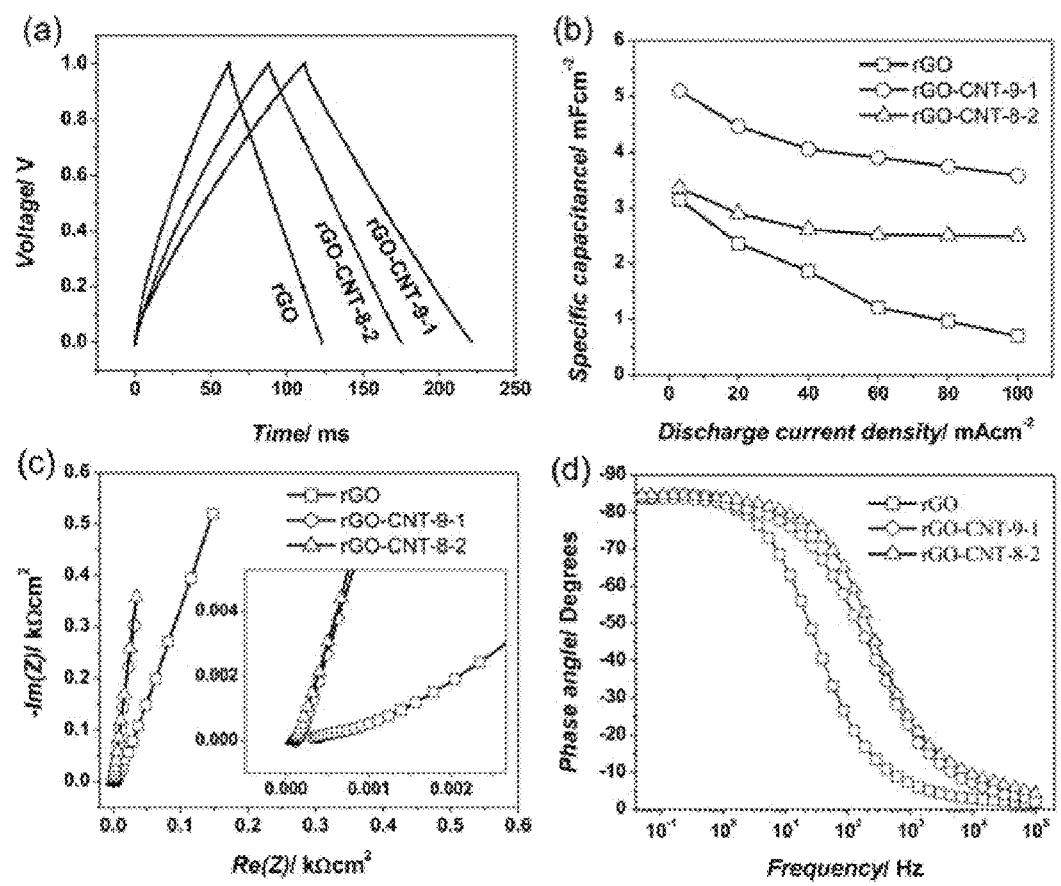
FIG. 19 shows a) Charge-discharge curves of micro-supercapacitors based on rGO, rGO-CNT-9-1 and rGO-CNT-8-2 electrodes. b) Specific capacitances of micro-supercapacitor at different discharge current densities. c) Nyquist plots of different micro-supercapacitors (inset shows the Nyquist plots at higher frequencies). d) phase angle vs. frequency for different micro-supercapacitor.

The areal specific capacitances of the micro-supercapacitors were calculated from CD curves at different discharge current densities and are shown in FIG. 19. The results from CD experiments were in good agreement with the CV results in terms of specific capacitance and rate handling of micro-supercapacitors. The highest specific capacitances at all discharge currents were achieved for the rGO-CNT-9-1 micro-supercapacitor with a specific capacitance of 5.10 mFcm$^2$ at a 3 mAcm$^{-2}$ discharge current density which dropped only by about 30% at a very high current density of 100 mAcm$^{-2}$ (3.6 mFcm$^2$). In comparison, the rGO-CNT-8-2 micro-supercapacitor showed a lower specific capacitance (3.4 mFcm$^2$ at 3 mAcm$^2$ current density), but slightly improved rate handling as its specific capacitance dropped by 26% upon increasing the discharge current to 100 mAcm$^2$. Based on our estimation of the weight of the electrode materials for each micro-supercapacitor (~4.5-6.2 μg), a discharge areal current density of 100 mAcm$^2$ approximately corresponds to gravimetric current density in the range of 450 to 600 Ag$^{-1}$, which is more than two orders of magnitude higher than the discharge current densities that are usually used in testing supercapacitors.[59]

The frequency response of the micro-supercapacitors was studied by EIS. The Nyquist plots of the micro-supercapacitors show typical features of EDCL supercapacitors (FIG. 19c). For an ideal EDLC the low-frequency region of the Nyquist plot is a straight line. The more vertical the line, the more closely the supercapacitor behaves as an ideal capacitor.[43,44,60] The low-frequency regions of Nyquist plots of rGO-CNT hybrid devices show straight lines with an almost 90° angle. The slope of 45° segment of a Nyquist plot is called the Warburg resistance and is a result of frequency dependence of diffusion of the electrolyte ions into the bulk of the electrode.[43,44] The much shorter Warburg regions of plots for rGO-CNT micro-supercapacitors show the better diffusion of ions into the bulk of electrodes compared to the rGO micro-supercapacitors. Furthermore, the rGO-CNT microdevices show lower equivalent series resistance (ESR) compared to the rGO microdevice (ESR can be calculated from the X-intercepts of Nyquist plots).

Figure 20:
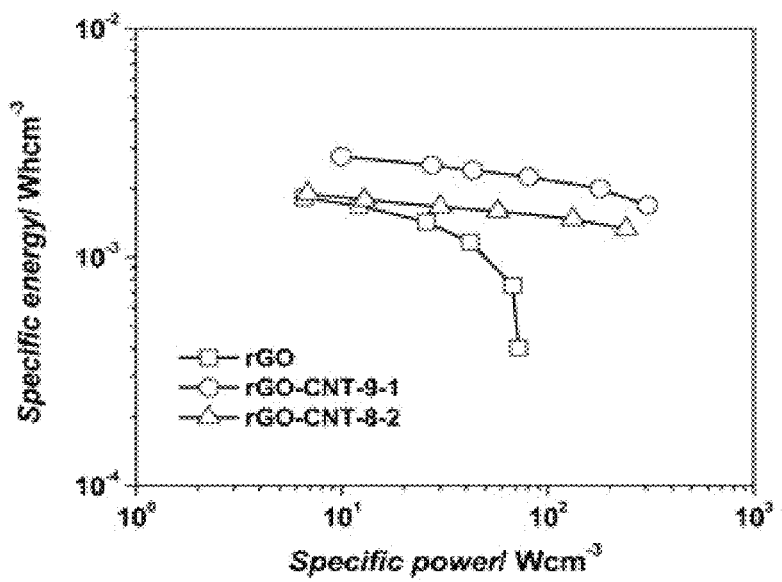
FIG. 20 is a Ragone plot showing the relationship of specific energy and the specific power of micro-supercapacitors.

For a more informative analysis of EIS tests, the dependence of phase angle with frequency of the microdevices was plotted in FIG. 19d. The rGO micro-supercapacitor showed frequency independent phase angles close to −90° for frequencies up to 2 Hz after which the phase angle increased with the increase in frequency. However, the rGO-CNT micro-supercapacitors showed frequency independent phase angle even at frequencies as high as 20 Hz. A better comparison of the frequency response of the microdevices can be made by comparing their characteristic frequency ($f_0$) which is the frequency at a phase angle of −45° or its corresponding relaxation time constant ($\tau_0=1/f_0$). The characteristic frequency marks the point at which the resistive and capacitive impedance are equal and at frequencies higher than $f_0$ supercapacitor shows a more resistive behavior.[60,61] The corresponding relaxation time constant ($\tau_0$) is the minimum time needed to discharge all the energy from the device with an efficiency of greater than 50%.[39,60] The rGO-CNT-8-2 micro-supercapacitor showed the best frequency response with the characteristic frequency of about 290.7 Hz and time constant of 3.4 ms. The rGO-CNT-9-1 micro-supercapacitor showed a slightly lower time constant of about 4.8 ms ($f_0$~208.6 Hz). In contrast, the time constant of rGO micro-supercapacitor was about 33 ms. To the best of our knowledge, so far, the best frequency response for a micro-supercapacitor was reported by Pech et al.[39] for OLC micro-supercapacitor tested in 1M Et$_4$NBF$_4$/ anhydrous propylene carbonate electrolyte. The OLC micro-supercapacitor, however, showed a time constant of 26 ms and a modest specific capacitance of 1.7 mFcm$^{-2}$ at a CV scan rate of 1 Vs$^{-1}$, which are both improved in case of our micro-supercapacitors. The volumetric energy and power density of micro-supercapacitors were calculated from CVs at a scan rate of 1 to 50 Vs$^{-1}$ and shown in a Ragone plot (FIG. 20). It is evident that the drop in energy density with increasing power density is very small in the case of rGO-CNT micro-supercapacitors. The highest energy density (~2.7 mWhcm$^{-3}$) and the highest volumetric power density (~300 Wcm$^{-3}$) were both achieved for the rGO-CNT-9-1 micro-devices.

The high specific capacitance, exceptional rate capability and high frequency response of the rGO-CNT micro-supercapacitors can be explained by the synergic effects of electrode materials, method of electrode assembly and structural design of micro-supercapacitors. First, using CNT as a nano spacer inhibits the agglomeration and restacking of graphene sheet, thus providing a highly accessible surface area for the micro-electrodes. Second, the binder-free deposition based on the ESD technique plays a role in high power handling of the micro-supercapacitors. It is well known that the addition of polymeric binders that are typically used in the fabrication of the electrodes hinders their performance by increasing resistivity and the addition of dead weight[42,61]. Third, another important factor affecting the high power capability of our micro-supercapacitors is the interdigital design of the electrodes. The small distance between the microelectrodes could minimize the electrolyte resistance by reducing the mean ionic diffusion pathway between the microelectrodes. Finally, the small size of the electrodes along with their side by side in-plane design facilitates the diffusion of electrolyte ions between the rGO sheets and in the entire thickness of the electrodes. The rGO-CNT micro-supercapacitors are able to satisfy the power needs of certain miniaturized electronic devices. For instance, they can power radio frequency identification (RFID) tags which generally require 1-100 μW power.[62] Furthermore, the high frequency response of the rGO-CNT micro-supercapacitors makes them an ideal device to be coupled with other devices such as energy harvesters and micro-batteries to provide peak power. With further optimization of the electrode compositions and structural design of micro-supercapacitors, they can potentially meet the necessary requirements to replace low energy and large electrolytic capacitors in ac line-filtering applications in portable electronics.[42] The reported fabrication method of micro-patterned rGO films can also be utilized for the development of other graphene based functional devices.

We have demonstrated the development of micro-supercapacitors based on rGO and rGO-CNT patterned microelectrodes with superior electrochemical properties through the combination of photolithography lift-off and ESD deposition. The fabrication process involved the ESD deposition of electrode materials on masked interdigital current collectors. The GO sheets in the precursor solution were readily reduced to rGO during the low temperature deposition, eliminating the need for further thermal or chemical reduction of GO. In the case of the rGO micro-supercapacitors, the diffusion of electrolyte ions between the rGO sheets resulted in electro-activation of the microelectrodes that increased the average CV current by more than 7 times during the first 200 cycles. We further demonstrated that the addition of CNTs as nano spacers between rGO sheets could minimize their restacking. The electrochemical performance tests indicated that while rGO microdevices had reasonable specific capacitance and power handling ability, the rGO-CNT micro-supercapacitor exhibited exceptional performance. The best results were achieved when a composition of 90% GO and 10% CNT was used in the deposition solution. The stack capacitance of rGO-CNT-9-1 micro-supercapacitors was about 5 Fcm$^{-3}$ at a 1 Vs$^{-1}$ CV scan rate, which dropped only by 40% at a very high scan rate of 50 Vs$^{-1}$. The excellent power response of these micro-supercapacitors was revealed by EIS experiments when an RC time constant of only 4.8 ms was measured at a −45° phase angle, which is lower than any other reported micro-supercapacitors. Increasing the amount of CNTs to 20% slightly improved the power response and rate handling ability of the micro-supercapacitors, but had a negative impact on the specific capacitance. The developed micro-supercapacitors promise high energy micron-scale energy storage units that are able to provide enough energy and satisfy the peak power required for a number of applications. They can also potentially replace low energy electrolytic capacitors in miniaturized electronic devices.

Preparation of Interdigital Microelectrodes and Removable Mask:

First, a Ti (100 nm)/Au (300 nm) layer was formed on a Si/(500 nm) SiO$_2$ by an electron-beam evaporation system. The interdigital current collectors were made by conventional photolithography and wet etching of the Ti/Au layer. To avoid deposition of materials in the space between the microelectrodes and on the contact pads, a removable mask was made on the samples by photolithography. The mask had two layers, a thin (~20 nm) Omnicoat sacrificial bottom layer and a thick (~12 μm) SU-8 (Microchem, USA) top layer. First, the Omnicoat was spin coated on the substrate and was baked at 200° C. for 60 s. Then the SU-8 layer was spin coated, and then baked for 180 s at 65° C. and 300 s at 95° C. The mask was patterned by photolithography with an OAI 800 mask aligner (OAI, USA) to uncover the microelectrodes. The excess Omnicoat on the uncovered parts of micro-electrodes was removed by oxygen plasma treatment at 200 mTorr with a power of 100 W for 30 s.

Preparation of Precursor Solutions:

Single layer GO (6 mg, 0.7-1.2 nm thickness and 300-800 nm dimension, Cheaptubes, Inc., USA) was added to 1,2-propanediol (20 ml, sigma—Aldrich, USA) and dispersed by sonication for 30 min with an ultrasonic probe (750 W, 20 KHz, Sonics and materials Inc., USA) to form a 0.3 mgml$^{-1}$ GO solution. This solution was directly used in ESD deposition of rGO samples. In the case of GO-CNT solutions, appropriate amounts of COOH-functionalized multi-walled CNT (8-15 nm diameter and 10-50 μm length Cheaptubes, Inc, USA) was added to the above solution to form solutions with GO:CNT ratios of 9:1 and 8:2, respectively.

Figure 21:
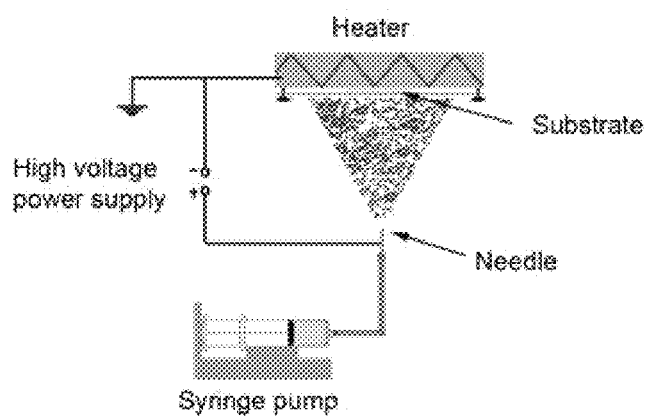
FIG. 21 is a schematic drawing showing the ESD set-up that was used to deposit rGO and rGO-CNT samples in this study.
Figure 22:
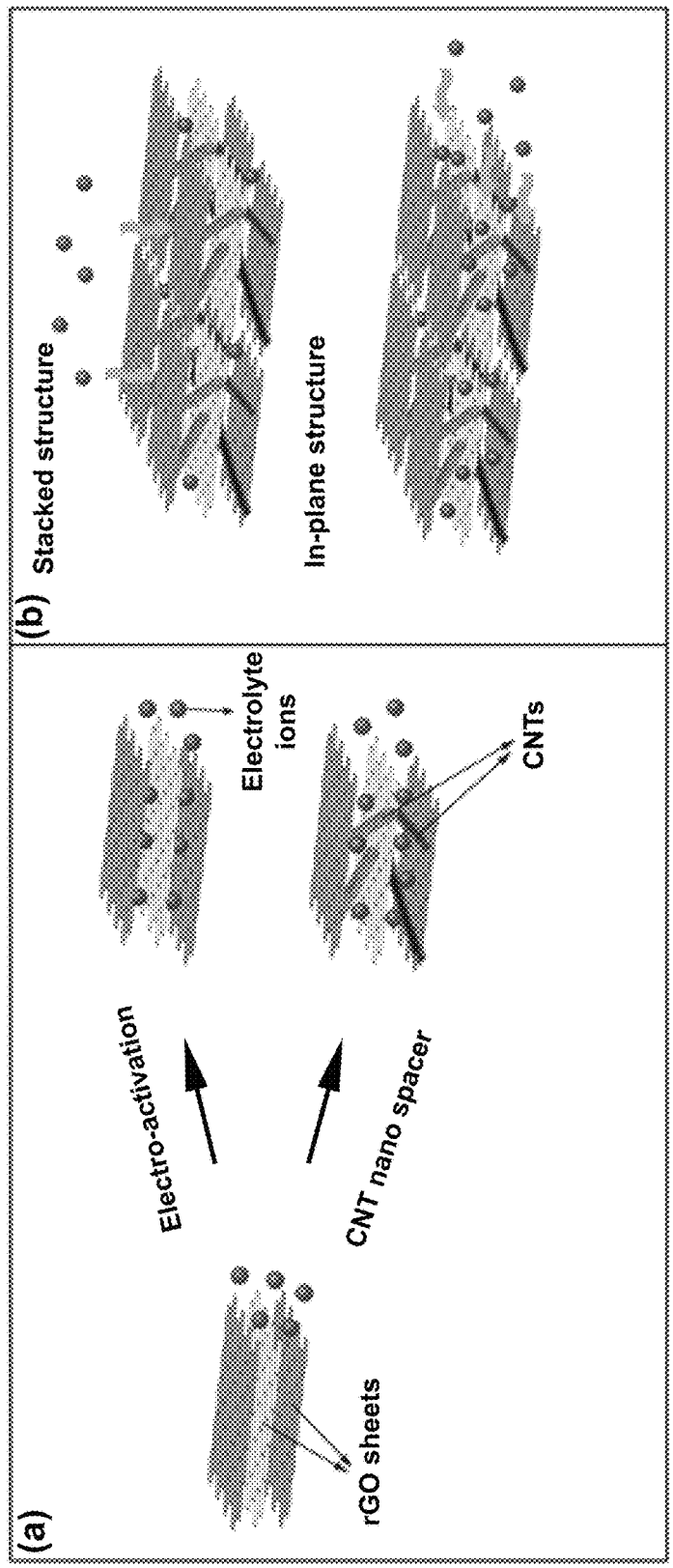
FIG. 22(a) Schematic drawing showing the two different mechanisms that are explained in this study for increasing accessibility of graphene electrodes.(b) Schematic depiction of diffusion path of electrolyte ions in stacked geometry of device compared to in-planed design that is used in this study (one electrode from each structure is shown).
Figure 23:
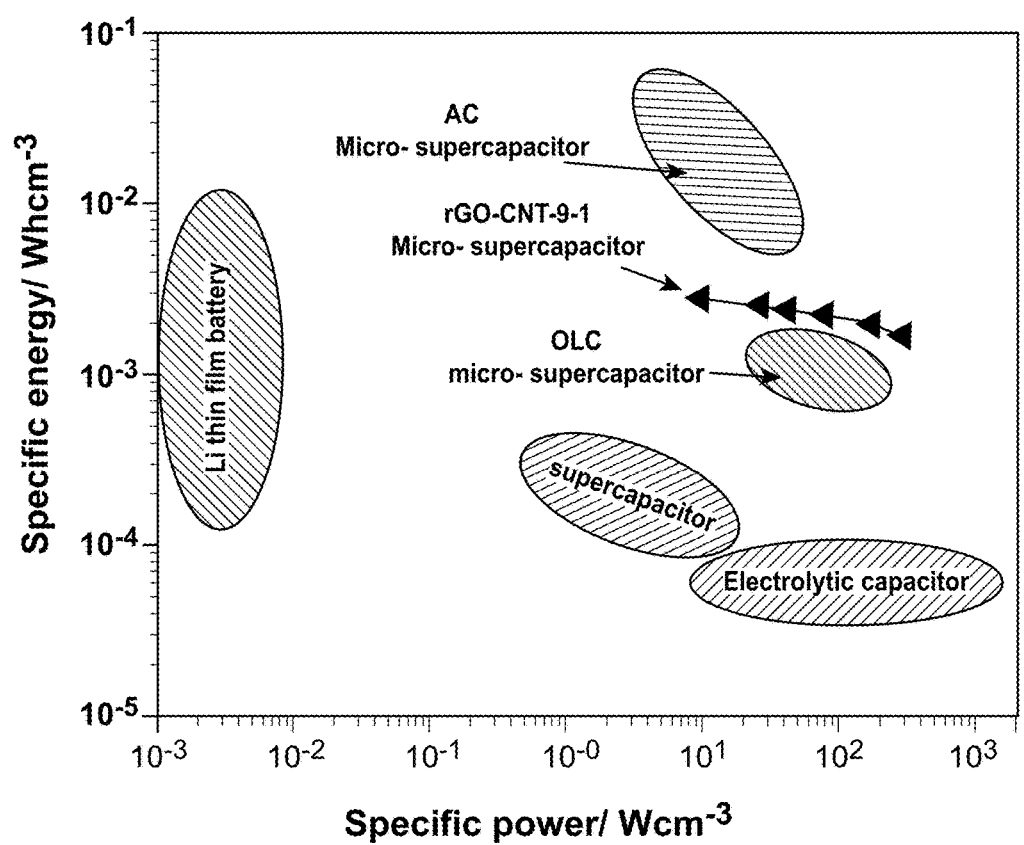
FIG. 23 is a comparison of energy and power density of rGO-CNT-9-1 micro-supercapacitors with some other energy storage devices. The energy and power density of micro-supercapacitor based on activated carbon (AC) and onion like carbon (OLC) as well as the performance of Li thin film battery (4V/500 μAh), supercapacitor (3.5 V/25 mF), and a typical electrolytic capacitor (63V/220 μF) were adapted from reference [39].

Electrostatic Spray Deposition:

All the samples were deposited by the ESD for 2 h on the masked Ti/Au interdigital microelectrodes. The samples were preheated to 250° C. before the deposition. The prepared precursor solutions were fed to a stainless steel needle using a syringe pump at the rate of 4-5 mlh$^{-1}$. The distance between the needle and the substrate was kept at 4 cm (FIG. 21 for the schematic drawing of the ESD set-up). The solution was sprayed onto the substrate by applying a voltage of 6-7 kV to the needle. After the deposition, the samples were soaked in remover PG (Microchem, USA) to remove the SU8 mask by etching the Omnicoat sacrificial layer.

Characterization of Samples:

The morphologies of as prepared samples were investigated using a JEOL 7000 field-emission scanning electron microscope (FE-SEM, JEOL, Japan). In order to study the reduction of GO during deposition, FTIR (JASCO FT/IR 4100 spectrometer) was used to analyze the oxygen functionalities of the sample GO before and after deposition. XPS (Physical Electronics 5400 ESCA) was used to quantitatively analyze the chemical compositions of GO and the resulting rGO after the deposition.

Electrochemical Testing:

After the fabrication of the micro-supercapacitors, the contact pads of each microdevice was connected to aluminum foil using silver paste. Then the microdevices were placed in a homemade Teflon cell with sealed cavity for the electrolyte. After filling the cavity of the cell with 3 M KCL electrolyte, electrochemical studies were performed using a VMP3 multichannel potentiostat (VMP3, Bio-Logic, USA) in the two-electrode mode and at room temperature. CVs were performed at scan rates ranging from 0.01 to 50 Vs$^{-1}$ in a potential range from 0 to 1 V. CD measurements were carried out in the same potential window and with current densities ranging from 3 to 100 mAcm$^{-2}$. EIS measurements were performed at open circuit voltage (OCV) by applying a sinusoidal signal of 10 mV amplitude at frequencies ranging from 100 kHz to 50 mHz.

Calculations:

The capacitance of the cell was calculated according to the following equation (1).

$$C_{Cell} = \frac{i}{\left(\frac{dV}{dt}\right)} \quad (1)$$

Where i is the average CV discharge current (A) and (dV/dt) is the CV scan rate (Vs$^{-1}$). The stack capacitance and the areal capacitance of the cells were calculated according to the following equations:

$$C_{stack} = \frac{C_{Cell}}{V} \quad (3)$$

$$C_{areal} = \frac{C_{Cell}}{A} \quad (4)$$

Where V and A are the volume and geometric surface area of the cell. The volume of the cells was calculated by multiplying the area of the cell (Including all interdigital electrodes and the spaces between them) into the combined thickness of current collectors and active materials. To be consistent with other reported data for micro-supercapacitors the specific capacitance of the cell (areal capacitance) was calculated by taking to the account the footprint area of the both electrodes. The specific capacitance galvanostatic CD tests was calculated according to $$C_{Cell} = \frac{i}{\left(\frac{dV}{dt}\right)s} \quad (5)$$

Where i is the current (A), (dV/dt) is the slope of the discharge curve (Vs$^{-1}$), and s is the geometric surface area of the both electrodes.

For a symmetric supercapacitors the total capacitance (C) of the cell can be calculated by using equation (6):

$$\frac{1}{C} = \frac{1}{C_1} + \frac{1}{C_2} \quad (6)$$

Assuming that the two electrodes of micro-supercapacitor equal capacitance ($C_1=C_2$), the capacitance of one electrode can be calculated from cell capacitance ($C_1=2C$).

The discharged power P (W) and the discharged energy W (Wh) were calculated by integration the CV curves in the whole potential range according to equations (7) and (8):

$$P = \int_0^1 I \times V \, dV \quad (7)$$

$$W = \frac{\Delta V}{s \times 3600} \times \int_0^1 I \times V \, dV \quad (8)$$

Where $\Delta V$ is the potential window (V), I is the current (A) and s is the CV scan rate ($Vs^{-1}$).

Table 1 below shows a comparison of various electrochemical properties of some of a selection of micro-supercapacitors.

invention. More specifically, it will be apparent that certain agents which are both chemically and physiologically related may be substituted for the agents described herein while the same or similar results would be achieved.

All patents, publications and references cited herein are hereby fully incorporated by reference. In case of conflict between the present disclosure and incorporated patents, publications and references, the present disclosure should control.

REFERENCES

[1] F. Albano, Y. S. Lin, D. Blaauw, D. M. Sylvester, K. D. Wise, A. M. Sastry, J. Power Sources 185 (2008) 1524-1532.
[2] J. D. Morse, Int. J. Energy Res. 31 (2007) 576-602.
[3] K. A. Cook-Chemault, N. Thambi, A. M. Sastry, Smart Mater. Struct. 17 (2008) 043001.
[4] J. H. Lim, D. J. Choi, H. K. Kim, W. I. Cho, Y. S. Yoon, J. Electrochem. Soc. 148 (2001) A275-A278.
[5] B. E. Conway, W. G. Pell, J. Solid State Electrochem. 7 (2003) 637-644.
[6] P. Simon, Y. Gogotsi, Nat. Mater. 7 (2008) 845-854.

TABLE 1

| Electrode material | electrolyte | potential range (V) | Specific capacitance ($mFcm^{-2}$) | Volumetric capacitance ($Fcm^{-3}$) | Specific energy | Specific power | Frequency response and rate capability |
|---|---|---|---|---|---|---|---|
| AC | 1M Et$_4$NBF$_4$ in PC | 0-2.5 | 2.1 | 2.7 (electrode) | N/A | 44.9 $mWcm^{-2}$ | Capacitance quickly drops at frequencies more than 10 mHz poor frequency response |
| CDC | 1.5M TEABF$_4$ | -1-1 | | 180 (electrode) | N/A | — | Capacitance drops to half of its initial value at scan rates as low as 500 $mVs^{-1}$ poor rate capability |
| CNT | BMIM/BF$_4$ | -0.5-0.5 | 0.428 | N/A | N/A | 0.28 $mWcm^{-2}$ | N/A |
| Gr | PVA/H$_3$PO$_4$ | 0-1 | <0.4 | N/A | 14 $nWhcm^{-2}$ | 9 $\mu Wcm^{-2}$ | The device was tested up to the scan rate of 0.01 $Vs^{-1}$ |
| OLC | 1M Et$_4$NBF$_4$ in PC | 0-3 | 1.7 at 1 $Vs^{-1}$ | ~1.35 at 1 $Vs^{-1}$ ~0.9 at 50 $Vs^{-1}$ | ~1.7 $mWhcm^{-3}$ at 1 $Vs^{-1}$ ~1.1 $mWhcm^{-3}$ at 50 $Vs^{-1}$ | ~200-250 $Wcm^{-3}$ | RC time constant of 26 ms indicating good frequency response. |
| AC | 1M Et$_4$NBF$_4$ in PC | 0-3 | 11.6 at 500 $mVs^{-1}$ | 9.0 at 0.01 $Vs^{-1}$ 0.5 at 20 $Vs^{-1}$ | ~18 $mWhcm^{-3}$ at 2 $Vs^{-1}$ ~0.6 $mWhcm^{-3}$ at 20 $Vs^{-1}$ | ~41 $Wcm^{-3}$ | RC time constant of 700 ms. Capacitance drops with increase in scan rate |
| Gr** | PVA/H$_2$SO$_4$ | 0-1 | 7.6 | N/A | <1 $\mu Whcm^{-2}$ | ~10 $\mu Wcm^{-2}$ | Capacitance drops by about 75% scan rate of 4 $Vs^{-1}$ |
| rGO-CNT-9-1 | 3M KCl | 0-1 | 5.63 | 4.9 at 1 $Vs^{-1}$ | ~2.7 $mWhcm^{-3}$ 1 $Vs^{-1}$ ~1.6 $mWhcm^{-3}$ 50 $Vs^{-1}$ | ~300 $Wcm^{-3}$ | RC time constant of 4.8 ms indicating excellent frequency response. |

**The reported data is for the supercapacitor with interdigital structure.

The foregoing describes and exemplifies aspects of the invention, but is not intended to limit the invention defined by the claims which follow. All of the methods and devices disclosed and claimed herein can be made and executed without undue experimentation in light of the present disclosure. While the materials and methods of this invention have been described in terms of specific embodiments, it will be apparent to those of skill in the art that variations may be applied to the materials and/or methods and in the steps or in the sequence of steps of the methods described herein without departing from the concept, spirit and scope of the

[7] J.-W. Sung, S.-J. Kim, K.-H. Lee, J. Power Sources 133 (2004) 312-319.
[8] W. Sun, X. Chen, J. Power Sources 193 (2009) 924-929.
[9] M. Kaempgen, C. K. Chan, J. Ma, Y. Cui, G. Gruner, Nano. Lett. 9 (2009) 1872-1876.
[10] D. Pech, M. Brunet, P. L. Taberna, P. Simon, N. Fabre, F. Mesnilgrente, V. Con&léra, H. Durou, J. Power Sources 195 (2010) 1266-1269.
[12] C. Wang, R. Zaouk, B. Y. Park, M. J. Madou, Int. J. Manufacturing Technology and Management, 13 (2008) 360-375.

[13] C. Wang, G. Jia, L. H. Taherabadi, M. J. Madou, J. Microelectromech. Syst. 14 (2005) 348-358.
[14] H. Xu, K. Malladi, C. Wang, L. Kulinsky, M. Song, M. J. Madou, Biosens. Bioelectron. 23 (2008) 1637-1644.
[15] C. Wang, L. Taherabadi, G. Jia, M. Madou, Y. Yeh, B. Dunn, Electrochem. SolidState Lett. 7 (2004) A435-A438.
[16] J. W. Long, B. Dunn, D. R. Rolison, H. S. White, Chem. Rev. 104 (2004) 4463-4492.
[17] A. Braun, M. Bartsch, 0. Merlo, B. Schnyder, B. Schaffner, R. Kötz, O. Haas•A. Wokaun, Carbon 41 (2003) 759-765. (it was 14 before)
[18] M. G. Sullivan, B. Schnyder, M. Bartsch, D. Alliata, C. Barbero, R. Imhof, R. Kötz, J. Electrochem. Soc. 147 (2000) 2636-2643.
[19] A. Dekanski, J. Stevanovic, R. Stevanocic, B. Z. Nikolic, V. M. Jovanovic, Carbon 39 (2001) 1195-1205.
[20] H. Li, J. Wang, Q. Chu, Z. Wang, F. Zhang, S. Wang, J. Power Sources 190 (2009) 578-586.
[21] B. E. Conway, Electrochemical Supercapacitors: Scientific Fundamentals and Technological Applications, Kluwer, New York, 1999.
[22] A. Singh, J. Jayaram, M. Madou, S. Akbar, J. Electrochem. Soc., 149 (3) (2002) E78-E83.
[23] M. G. Sullivan, R. Kötz, O. Haas, J. Electrochem. Soc. 147 (2000) 308-317.
[24] T. Nagaoka, T. Yoshino, Anal. Chem. 58 (1986) 1037-1042.
[25] H. Xu, X. Fan, Y. Lu, L. Zhong, X. Kong, J. Wang, Carbon 48 (2010) 3293-3311
[26] J. Niu, W. G. Pell, B. E. Conway, J. Power Sources 156 (2006) 725-740.
[27] J. Wang, Y. Xu, X. Chen, X. Du, J. Power Sources 163 (2007) 1120-1125.
[28] E. Frackowiak, Phys. Chem. Chem. Phys. 9 (2007) 1774-1785.
[29] A. Braun, J. Kohlbrecher, M. Bärtsch, B. Schnyder, R. Kötz, 0. Haas, A. Wokaun, Electrochim. Acta 49 (2004) 1105-1112.
[30] P. W. Ruch, M. Halm, D. Cericola, A. Menzel, R. Kötz, A. Wokaun, Carbon 48 (2010) 1880-1888.
[31] K. Kierzek, E. Frackowiak, G. Lota, G. Gryglewicz, J. Machnikowski, Electrochim. Acta 49 (2004) 515-523
[32] M. Beidaghi, W. Chen, C. Wang, *J. Power Sources* 2011, 196, 2403.
[33] M. Xue, Z. Xie, L. Zhang, X. Ma, X. Wu, Y. Guo, W. Song, Z. Li, T. Cao, *Nanoscale* 2011, 3, 2703-8.
[34] M. Beidaghi, C. Wang, *Electrochim. Acta* 2011, 56, 9508.
[35] K. Wang, W. Zou, B. Quan, A. Yu, H. Wu, P. Jiang, Z. Wei, *Adv. Energy Mater.* 2011, 1, 1068-1072.
[36] D. Pech, M. Brunet, P.-L. Taberna, P. Simon, N. Fabre, F. Mesnilgrente, V. Conédéra, H. Durou, *J. Power Sources* 2010, 195, 1266.
[37] J. Chmiola, C. Largeot, P. L. Taberna, P. Simon, Y. Gogotsi, *Science* 2010, 328, 480.
[38] M. Heon, S. Lofland, J. Applegate, R. Nolte, E. Cortes, J. D. Hettinger, P.-L. Taberna, P. Simon, P. Huang, M. Brunet, Y. Gogotsi, *Energy Environ. Sci.* 2011, 4, 135.
[39] D. Pech, M. Brunet, H. Durou, P. Huang, V. Mochalin, Y. Gogotsi, P.-L. Taberna, P. Simon, *Nat. Nanotechnol.* 2010, 5, 651.
[40] M. Kaempgen, C. K. Chan, J. Ma, Y. Cui, G. Gruner, *Nano let.* 2009, 9, 1872.
[41] W. Gao, N. Singh, L. Song, Z. Liu, A. L. M. Reddy, L. Ci, R. Vajtai, Q. Zhang, B. Wei, P. M. Ajayan, *Nat. Nanotechnol.* 2011, 6, 6.
[42] J. R. Miller, R. a Outlaw, B. C. Holloway, *Science* 2010, 329, 1637.
[43] M. D. Stoller, S. Park, Y. Zhu, J. An, R. S. Ruoff, *Nano lett.* 2008, 8, 3498.
[44] Y. Wang, Z. Shi, Y. Huang, Y. Ma, C. Wang, M. Chen, Y. Chen, *J. Phys. Chem. C* 2009, 113, 13103.
[45] Y. Zhu, S. Murali, M. D. Stoller, K. J. Ganesh, W. Cai, P. J. Ferreira, A. Pirkle, R. M. Wallace, K. a Cychosz, M. Thommes, D. Su, E. A. Stach, R. S. Ruoff, *Science* 2011, 332, 1537.
[46] Q. Cheng, J. Tang, J. Ma, H. Zhang, N. Shinya, L.-C. Qin, *Phys. Chem. Chem. Phys.* 2011, 13, 17615.
[47] Y. Wang, Y. Wu, Y. Huang, F. Zhang, X. Yang, Y. Ma, Y. Chen, *J. Phys. Chem. C* 2011, 115, 23192.
[48] S.-Y. Yang, K.-H. Chang, H.-W. Tien, Y.-F. Lee, S.-M. Li, Y.-S. Wang, J.-Y. Wang, C.-C. M. Ma, C.-C. Hu, *J. Mater. Chem.* 2011, 21, 2374.
[49] J. J. Yoo, K. Balakrishnan, J. Huang, V. Meunier, B. G. Sumpter, A. Srivastava, M. Conway, A. L. M. Reddy, J. Yu, R. Vajtai, P. M. Ajayan, *Nano lett.* 2011, 11, 1423.
[50] C. D. Zangmeister, *Chem. Mater.* 2010, 22, 5625.
[51] H. C. Huang, C. W. Huang, C. T. Hsieh, P. L. Kuo, J. M. Ting, H. Teng, *J. Phys. Chem. C* 2011, 115, 20689.
[52] W. Gao, L. B. Alemany, L. Ci, P. M. Ajayan, *Nat. chem.* 2009, 1, 403.
[53] B. Xu, S. Yue, Z. Sui, X. Zhang, S. Hou, G. Cao, Y. Yang, *Energy Environ. Sci.* 2011, 4 2826.
[54] X. Fan, W. Peng, Y. Li, X. Li, S. Wang, G. Zhang, F. Zhang, *Adv. Mater.* 2008, 20, 4490.
[55] O. C. Compton, B. Jain, D. a Dikin, A. Abouimrane, K. Amine, S. T. Nguyen, *ACS nano* 2011, 5, 4380.
[56] Y. Gogotsi, P. Simon, *Science* 2011, 334, 917.
[57] H. J. In, S. Kumar, Y. Shao-Horn, G. Barbastathis, *Appl. Phys. Lett.* 2006, 88, 083104.
[58] Z. Weng, Y. Su, F. Li, J. Du, *Adv. Energy Mater.* 2011, 1, 917.
[59] G. Wang, L. Zhang, J. Zhang, *Chem. Soc. Rev.* 2011, 41, 797.
[60] P. L. Taberna, P. Simon, J. F. Fauvarque, *J. Electrochem. Soc.* 2003, 150, A292.
[61] V. Presser, L. Zhang, J. J. Niu, J. McDonough, C. Perez, H. Fong, Y. Gogotsi, *Adv. Energy Mater.* 2011, 1, 423.
[62] J. A. Paradiso, *IEEE Pervasive Comput.* 2005, 4, 18.

What is claimed is:
1. A method for forming an electrochemical double layer capacitor, comprising:
electrochemically activating a surface of a C-MEMS carbon structure in the presence of 0.1 M to 2 M acid in an aqueous solution by exposing the surface to an electrochemical cell to increase the surface area of the C-MEMS carbon structure by at least 100-fold and thereby increase the double layer capacitance of the C-MEMS carbon structure, wherein electrochemically activating the surface of the C-MEMS comprises:
anodizing the surface of the C-MEMS carbon structure by applying a positive voltage using the electrochemical cell; and
negatively polarizing the anodized C-MEMS carbon structure by applying a negative voltage using the electrochemical cell, and wherein
the C-MEMS carbon structure is a patterned and pyrolized negative tone photoresist polymer, and the pattern of the patterned and pyrolized negative tone photoresist polymer is created through a photolithography process.

2. The method of claim 1, wherein the activating further comprises applying a voltage of from 1.5 to 4 V with respect to a Ag/AgCl reference electrode.

3. The method of claim 2, wherein the positive voltage is applied for about 15 minutes to about 45 min.

4. The method of claim 1, wherein the acid comprises sulfuric acid, nitric acid, phosphoric acid, hydrochloric acid, or a mixture thereof.

5. The method of claim 1, wherein the acid has a concentration of about 0.5 M to about 2 M.

6. The method of claim 1, wherein the increase in surface area is 500 times or greater than the surface area of the C-MEMS carbon structure prior to activation.

7. The method of claim 1, further comprising forming the C-MEMS carbon structure by
   spin coating a negative tone photoresist polymer on a substrate;
   exposing the negative tone photoresist polymer to UV light to form a first intermediate;
   spin coating a second negative tone photoresist polymer on the first intermediate to form a second intermediate; and
   exposing the second intermediate to UV light and pyrolizing the resulting material to form the C-MEMS carbon structure.

8. The method of claim 7, comprising:
   applying a positive voltage of 1.9 V with respect to a Ag/AgCl reference electrode for about 10 minutes to about 30 minutes in the presence of a 0.5M aqueous sulfuric acid solution to the C-MEMS carbon structure; and
   negatively polarizing the C-MEMS carbon structure by applying a potential difference of −0.3 V.

9. The method of claim 8, wherein the negative tone photoresist polymer comprises SU-8.

10. The method of claim 1, wherein the negative tone photoresist polymer comprises SU-8.

11. A method of activating a surface of a C-MEMS carbon structure to form an electrochemical double layer capacitor comprising:
    applying a voltage of 1.5 to 4 V with respect to a Ag/AgCl reference electrode to the surface for about 15 minutes to about 45 minutes in the;
    negatively polarizing the C-MEMS carbon structure by applying a potential difference;
    and wherein the C-MEMS carbon structure is a patterned and pyrolized negative tone photoresist polymer.

12. The method of claim 11, wherein the negative tone photoresist polymer comprises SU-8.

13. A method of activating a surface of a C-MEMS carbon structure to form an electrochemical double layer capacitor, comprising:
    applying a positive voltage with respect to a Ag/AgCl reference electrode to the C-MEMS carbon structure in the presence of a 0.1 M to 2 M acid in an aqueous solution for at least 10 minutes to produce an anodized C-MEMS carbon structure;
    negatively polarizing the anodized C-MEMS carbon structure by applying a negative voltage with respect to a Ag/AgCl reference electrode to produce a C-MEMS carbon structure having increased double-layer capacitance.

* * * * *